United States Patent
Seccombe

(10) Patent No.: US 8,152,262 B2
(45) Date of Patent: Apr. 10, 2012

(54) MEANS FOR HIGHER SPEED INKJET PRINTING

(76) Inventor: S. Dana Seccombe, Foster City, CA (US)

( * ) Notice: Subject to any disclaimer, the term of this patent is extended or adjusted under 35 U.S.C. 154(b) by 1068 days.

(21) Appl. No.: 11/659,275

(22) PCT Filed: Aug. 8, 2005

(86) PCT No.: PCT/US2005/028028
§ 371 (c)(1), (2), (4) Date: May 17, 2007

(87) PCT Pub. No.: WO2006/017800
PCT Pub. Date: Feb. 16, 2006

(65) Prior Publication Data
US 2008/0284804 A1 Nov. 20, 2008

Related U.S. Application Data

(60) Provisional application No. 60/599,395, filed on Aug. 6, 2004.

(51) Int. Cl.
B41J 2/21 (2006.01)
(52) U.S. Cl. .......................................................... 347/9
(58) Field of Classification Search .................. None
See application file for complete search history.

(56) References Cited

U.S. PATENT DOCUMENTS

| | | | |
|---|---|---|---|
| 4,272,771 A | 6/1981 | Furukawa | 346/75 |
| 5,376,958 A | 12/1994 | Richtsmeier et al. | 347/40 |
| 5,428,375 A | 6/1995 | Simon et al. | 347/12 |
| 5,456,539 A | 10/1995 | Wright et al. | 400/82 |
| 5,459,498 A | 10/1995 | Seccombe et al. | |
| 5,541,629 A | 7/1996 | Saunders et al. | |
| 5,650,811 A | 7/1997 | Seccombe et al. | |
| 5,657,061 A | 8/1997 | Seccombe et al. | |
| 5,688,057 A | 11/1997 | Wright et al. | 400/82 |
| 5,726,772 A | 3/1998 | Parker et al. | 358/456 |
| 5,808,655 A * | 9/1998 | Haas et al. | 347/234 |
| 5,812,155 A | 9/1998 | Seccombe | |
| 5,864,349 A | 1/1999 | Hirabayashi et al. | 347/39 |
| 5,980,028 A | 11/1999 | Seccombe | |
| 6,020,976 A | 2/2000 | Fujita et al. | 358/1.3 |
| 6,025,928 A | 2/2000 | Takemura et al. | 358/1.3 |
| 6,033,048 A | 3/2000 | Nicoloff, Jr. et al. | 347/12 |
| 6,033,064 A | 3/2000 | Pawlowski, Jr. et al. | |
| 6,057,933 A | 5/2000 | Hudson et al. | 358/1.9 |
| 6,082,849 A | 7/2000 | Chang et al. | 347/43 |
| 6,095,637 A | 8/2000 | Hirabayashi et al. | 347/43 |
| 6,099,108 A | 8/2000 | Weber et al. | |
| 6,155,670 A * | 12/2000 | Weber et al. | 347/43 |
| 6,193,347 B1 * | 2/2001 | Askeland et al. | 347/15 |

(Continued)

OTHER PUBLICATIONS

Hewlett Packard Journal, Feb. 1994, vol. 45, Issue 1.

Primary Examiner — Stephen Meier
Assistant Examiner — Alexander C Witkowski
(74) Attorney, Agent, or Firm — Allston L. Jones; Peters Verny, LLP

(57) ABSTRACT

A method and apparatus for subdividing and printing regions of a substrate with multiple print heads or multiple print head assemblies which substantially decreases printing time is described. The method includes a feathering method which reduces overlap artifacts which is useful in any printing situation where adjacent regions are printed that could be misaligned, offset, or have slightly different colors.

39 Claims, 24 Drawing Sheets

U.S. PATENT DOCUMENTS

| | | |
|---|---|---|
| 6,257,714 B1 | 7/2001 | Seccombe |
| 6,304,333 B1 | 10/2001 | Shaked et al. ............... 358/1.1 |
| 6,331,053 B1 | 12/2001 | Seccombe et al. |
| 6,354,694 B1 | 3/2002 | Weber et al. |
| 6,357,847 B1 | 3/2002 | Ellson et al. ................. 347/12 |
| 6,364,471 B1 | 4/2002 | Seccombe |
| 6,460,969 B1 | 10/2002 | Pinkernell .................... 347/43 |
| 6,471,332 B1 | 10/2002 | Vilanova et al. ............. 347/43 |
| 6,499,838 B2 | 12/2002 | Seccombe et al. |
| 6,543,871 B1 | 4/2003 | Rosen et al. ................. 347/15 |
| 6,578,959 B1 | 6/2003 | Seccombe |
| 6,588,877 B2 | 7/2003 | Sloan, Jr. et al. ............ 347/40 |
| 6,623,106 B2 | 9/2003 | Silverbrook ................. 347/49 |
| 6,980,328 B2 | 12/2005 | Hudson |
| 2003/0007165 A1 | 1/2003 | Hudson |
| 2004/0079248 A1 | 4/2004 | Mayer et al. |

* cited by examiner

122 L  125 L  124  125 R  122

122L   125 L   124   125R   122R 122L   125 L   124   125R   122R

MEANS FOR HIGHER SPEED INKJET PRINTING

CROSS REFERENCE

This application claims priority from PCT/US2005/028,028 having an International Filing date of Aug. 8, 2005 which in turn claims priority from a U.S. Provisional Application of the same title having Ser. No. 60/599,395 filed Aug. 6, 2004.

BACKGROUND OF THE INVENTION

1. Field of the Invention

Methods and apparatus for subdividing and printing regions of a substrate with multiple print heads or multiple print head assemblies which substantially decreases printing time. The methods include a feathering method which reduces overlap artifacts which is useful in any printing situation where adjacent regions are printed that could be misaligned, offset, or have slightly different colors.

2. Description of Prior Art

Inkjet printing has evolved from early systems with one nozzle which was scanned across a medium ejecting a droplet of ink when the nozzle is positioned over a to-be printed area, to systems with multiple nozzles arrayed on a Nozzleplate in a scanning Printhead (for a single color). Later multiple, different colored Printheads ganged together, and scanned as a unit called a Printhead Array. Also popular is a single printhead with a nozzle plate with up to four rows of nozzles, each of said rows ejecting one of cyan, magenta, yellow, or black.

Other implementations of inkjet printing have used Pagewidth Array heads, with the nozzle array as wide as the page or substrate to be printed. In the Pagewidth Array configuration, the Pagewidth Printhead Assembly would have at least as many nozzles as resolution elements of each color to be printed, and might consist of four Pagewidth Arrays, for each of cyan, magenta, yellow and black.

A more complete discussion of inkjet printing and print algorithms can be found in the Hewlett Packard Journal, February 1994, and available at http://www.hpl.hp.com/hp-journal/94feb/feb94.htm.

Throughout the history of inkjet printing, designers have struggled to simultaneously improve throughput, quality, and cost, which generally trade off against each other.

Many scanning head inkjet printing systems have been designed, with attention to different user needs for size of the substrate, type of substrate, speed, printing fluid, and cost. All scanning head inkjet systems have in common a basic mechanism of moving the substrate in one direction, called the paper axis in the case of conventional office printers; and moving the nozzles, printhead, or ganged printheads in a perpendicular direction, called the scan axis in the case of conventional office printers; thus enabling complete coverage of a 2 dimensional substrate with print fluid, subject to the interruption of droplet ejection by a control mechanism. The terms paper axis refers more generally to the direction that the substrate is indexed, even though the actual substrate might be fabric or other material. The term scan axis refers to the direction that printheads move. The control mechanism determines the pattern of fluid impinging on the substrate, which pattern generally can be configured to any shape, subject to various mechanical, electrical, and fluid flow limitations which can limit how accurately fluid can be placed, and how fast and accurately the scanning head or paper can be repositioned, and the rate at which fluid can be ejected.

Most scanning head ink jet printers scan a Printhead (or Printhead Array, composed of multiple printheads) laterally across a page, depositing ink in a Swath Height which is the length of the NozzlePlates Nozzle Array. Then the paper is indexed in the direction of the paper axis, and the printhead is again scanned back across the page, in the opposite direction. The printer may or may not jet ink during the retrace scan as determined by the print algorithm, which is designed to optimize and trade off print quality and speed. The index amount may be less than the full Swath Height, allowing interlacing of the ink deposited on the page to hide line feed errors and errors created by missing or mis-directed nozzles, as determined by the print algorithm. The print rate is determined by the mechanics of scanning the Printhead, and is fixed by primarily the following factors:

A. The Swath Height;
B. The scanning rate (velocity that the printhead traverses the page);
C. The number of interlaced scans necessary to achieve the desired image quality;
D. The overtravel of the printhead—which is the width of the active region of the print head or print head assembly; and
E. The acceleration and deceleration rate of the printhead.

Inkjet printer manufacturers have struggled to get the highest print rate (pages per minute), at the lowest manufacturing cost, while still maintaining the highest quality.

To date there have been two approaches to improving print speed:

A. Adjusting parameters of the factors associated with scanning heads, described above; and
B. Using page width arrays.

But, there is difficulty in improving scanning heads because the key parameters which affect speed are near their practical limits. For example:

A. Swath height: It is difficult to make swath height much larger than 1 inch because the paper underneath the Nozzle Array cannot be held flat enough in a region wider than that to avoid 'head crashes', i.e., where the printhead, as it moves, hits the paper. The inability to maintain a constant separation of the paper from the printhead can be the result of imperfections in the manufacturing tolerances of the printer, internal stresses in the paper which tend to bow it, or "cockle" which is bending due to swelling of the paper fibers as a result of absorption of the water in the ink. Swath Height can be increased by using either a printhead with a larger swath height (which are expensive to produce) or two or more printheads offset in the paper-axis direction to provide the effect of a single cartridge with wider swath height. Both implementations are subject to problems with flatness of the paper in the flat zone, among other issues, and have not found much commercial use. Examples of the staggered heads in the vertical (paper axis) direction is found in U.S. Pat. No. 5,376,958 by Brent Richtsmeier and U.S. Pat. No. 6,460,969 by Pinkernell for application to small format printers.

FIG. 1 (prior art) shows a cut fed sheet 100, with a printable region 102. The printhead ganged set 108 is shown here without the carriage to be able to show the relative position of the various components more clearly. Printhead ganged set 108 as shown here includes printheads 106 K', 106Y, 106K, 106C, and 106M. Each of the printheads 106 includes a nozzle array 104 that is shown as a rectangle within the outline of each printhead (such a nozzle array would only be visible from the bottom of the printhead however it is shown here to illustrate the functioning of the inkjet printer). As printhead ganged set 108 scans the page it can be seen from FIG. 1 that printhead 106K' is positioned exactly one row higher than, and staggered to the left of, printhead 106K with staggered black cartridges 106 K' and 106K effectively simulating a single long nozzle array comprised of two nozzle arrays 104 as printhead ganged set 108 scans across the page. This can be visualized by mentally transposing printhead 106K to a position just below printhead 106K' where it could be seen that the bottom edge of nozzle 104 of printhead 106K' is substantially aligned with the top edge of nozzle 104 of printhead 106K.

The technique of vertically staggered printheads has been used in wide format printers such as the MacDermid Displaymaker X-12™ printer at the cost of wider paper-to-printhead separation, and hence lower print quality.

B. Scanning rate: Scanning rate is determined by the formula: scanning rate (ips)=firing frequency/dpi (where ips is inches per second and dpi is dots per inch, the printer resolution). Scanning rates above about 30 inches per second used for 600 dpi printheads imply higher frequencies than can be supported by printhead hydraulics (e.g., maximum ink flow rate) and power limitations, especially since to increase quality, the desired number of dots per inch have also been increasing. One attempt to increase the scanning rate for black uses a second black cartridge as described by Vilanova et. al in U.S. Pat. No. 6,471,332 B1, which is incorporated in its entirety by reference here. Vilanova uses two adjacent black cartridges, firing alternately, to achieve higher scanning rates without exceeding the hydraulically limited frequency for the cartridge, and does succeed in increasing the possible scanning velocity. However, this scheme results in only minor speed improvements for office printers because the acceleration and deceleration times required to reverse direction and the increased overtravel from the addition of the second black printhead almost completely offset the increased scanning speed.

C. Also, higher scan rates require higher print head accelerations which necessitate the inclusion of large expensive motors to reverse the direction of the printhead at the ends of the scan lines in a short amount of time, results in annoying printer vibration.

D. Overtravel (i.e., the extra distance that printhead ganged set 108 must travel for all of printheads 106 in the set to move beyond the printable area of the page) cannot be reduced below 0 inches, and in any case, does not matter much once it gets significantly below the width of the printable region 102.

E. Interlacing has been dictated by the inability to cover up paper advance errors and missing or mis-directed nozzles. Little progress has been made to date in completely eliminating missing or mis-directed nozzles, although some technologies are better than others.

On the other hand, page width arrays are expensive because they require full page widths of silicon heads for each of at least 4 colors (4×8.5 inches=34 inches of silicon currently costing at least $20/inch manufacturing cost), and the heads are sensitive to particle defects because there is no way to interlace scans as is done with scanning head printers. Thus to make an effective page width design requires redundant sets of nozzles, meaning, in reality, a viable page width array would probably require at least 3 complete sets of 4-color page width nozzle arrays. This is a very expensive proposition, and not viable for printers that are intended to sell for under a few hundred dollars.

Therefore, for black print speeds between about 18 pages per minute (achievable with 1 inch high printheads) and 100 pages per minute (achievable with page width arrays) for small format printers, there has, to date, been no cost effective inkjet solution. For purposes of this discussion, all print speeds discussed are actual print speeds for a full page of text, which is typically much slower than "specification speeds" quoted-by-manufacturers on easy-to-print, sparsely covered documents. Although, today there are inexpensive printers that claim "20 pages per minute", this is for a sparsely printed page, typically printed in a fast, and lower quality, draft mode).

Large format printers also have reached speed limitations. They have large flat zones which limit the resolution that can be accurately printed. Further increases in print speed at high quality require an advance in the state of the art.

To achieve high quality, there are printers that interlace their scans by factors of 3 or more to hide line feed errors, or missing nozzles. This means that they advance the paper only ⅓ of the swath height, or less per scan—resulting in 3 times or more the total page printing time than would be the case if each print swath could be butted against the following swath with little overlap.

The present invention optionally incorporates a scheme for butting regions printed by different printheads without visible lines, gaps, or changes in color. Past schemes include those in two patents: U.S. Pat. No. 6,357,847 assigned to Xerox which describes using a zigzag border between the regions, and does not fully hide the borders; and U.S. Pat. No. 6,033,048 assigned to Hewlett Packard which describes a shingling/interlacing scheme for hiding line feed errors which slows printing, is inappropriate for butting of vertical regions, and incompletely hides variable overlaps.

Each of the shortcomings of the prior art noted above, as well as others, are overcome by the present invention.

SUMMARY OF THE PRESENT INVENTION

It is an object of the present invention to significantly increase print speed of inkjet printers, without significantly increasing their cost. Further, the present invention enables this improvement by using existing prior art components, whenever possible, and provides a saving of $100s of millions in manufacturing tooling costs. It is a further object of the present invention to increase the quality of segmented page-width array printers by eliminating print defects arising from mechanical tolerances at printed segment boundaries.

Further objects and advantages of the present invention will become apparent from a consideration of the drawings and the ensuing description.

The present invention is a method and an apparatus for increasing the printing speed by subdividing the printed substrate into 2 or more disjoint regions (except for, where appropriate, a small overlap region) which are printed with printheads or printhead arrays dedicated to each region, optionally using novel print algorithms that hide buffing errors.

A further use of the novel print modes of the present invention is in the hiding horizontal artifacts which result from errors such as sheet feed errors. Use of this mode in the paper axis direction (the direction the paper moves in a sheet fed, or continuous web printer) obviates partial line feeds and shingling which would otherwise be needed to hide those errors, resulting in another speedup factor.

The present invention further enables simultaneous high speed double sided printing, greatly speeding up the printing of double sided documents, which would otherwise have to be produced by collecting the documents printed on one side, then flipping them over and running them through the printer a second time.

BRIEF DESCRIPTION OF THE DRAWINGS

NOTE: In several of the figures the printhead arrays are shown without the mechanical details of the printhead transport mechanism to allow easier visualization of the functioning of the prior art and the present invention.

FIGS. 10 A-E illustrate the use of the same algorithm of the present invention applied to the same 90% dense halftone image as in FIGS. 6, 8, and 9.

FIG. 28 E shows the dots printed by a right printhead using the Alpha r function of FIG. 28B and in the same region depicted in FIGS. 28A and 28B.

DETAILED DESCRIPTION OF THE PRESENT INVENTION

The embodiments described herein pertain to printing, including and not limited to cut sheet, or web feed formats; small format home printers to higher speed office printers; large format printers; fabric printers; and package markers, inkjet or laser; scanning head or fixed head. Printing also includes the application of material other than ink, for instance biological markers, reagents, catalysts, etc.

Inkjet printing will be used as an example, although the present invention applies to other forms of "printing" as well.

The invention discussed below relates to primarily to scanning head inkjet printing, and also any other form of printing where adjacent print regions may be formed to increase print speed, including printing with Segmented Pagewidth Array heads, which are fabricated from segments butted together to span the width of a page.

The embodiments of the present invention have been designed with the purpose of increasing inkjet printing speeds over those of the prior art without sacrificing quality by incorporation of one or more of the following:

A. subdividing the substrate into multiple regions each with its own printhead or printhead arrays and optionally employing appropriate novel print modes to hide raster spacing errors;

B. reducing the amount of interlacing through the use of the appropriate novel print modes;

C. bidirectional printing;

D. printing on both sides of the document simultaneously.

A first preferred embodiment of the present invention increases the full page, high quality mode black text print rate of a printer over the speed of prior art ink jet printers by about double without incurring much additional cost.

Figure 1:
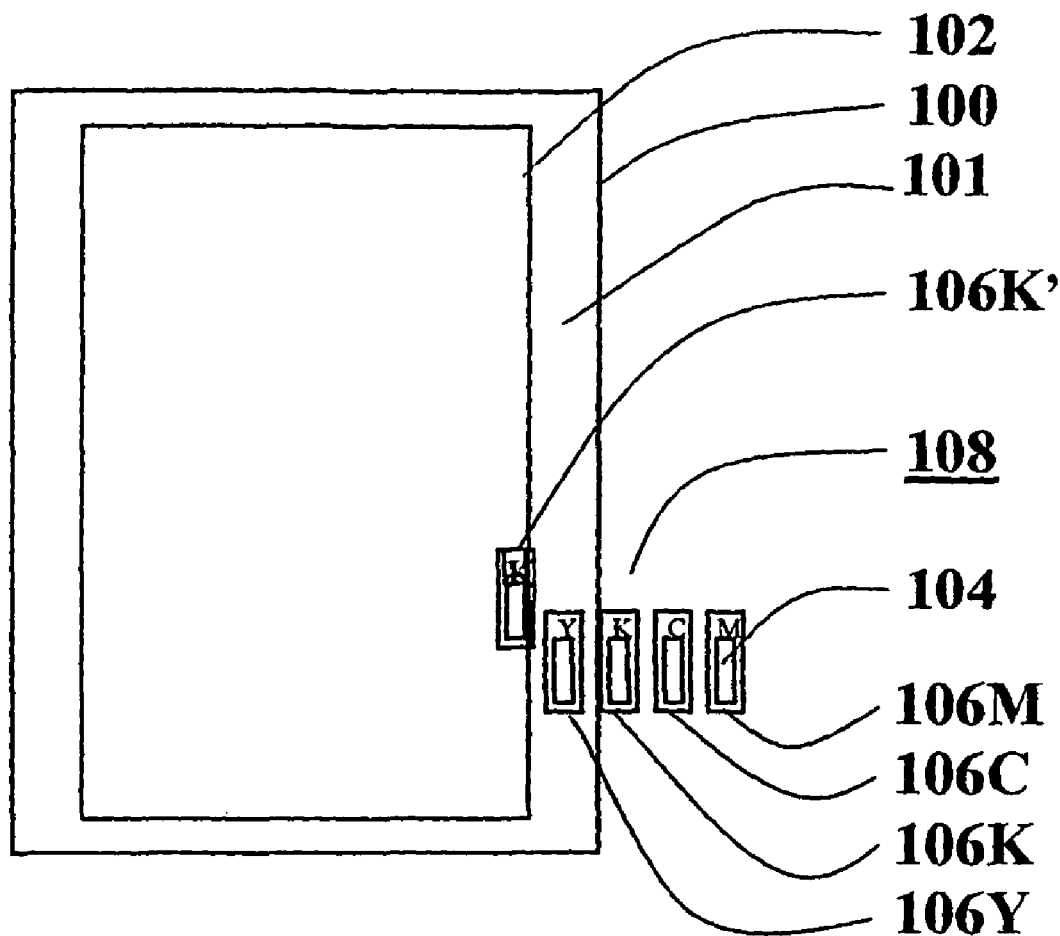
FIG. 1 shows a simplified top view of a prior art scanning head of an inkjet printer aligned with a substrate (e.g., sheet of paper) to show its orientation therewith add the paper path, illustrating prior attempts to improve print rate.
Figure 2A:
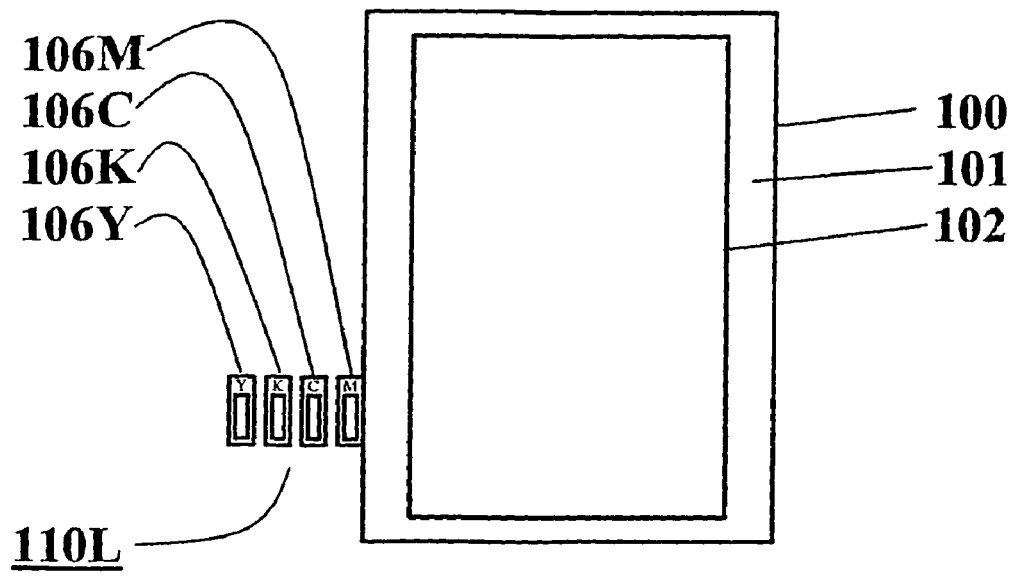
FIGS. 2A and 2B show simplified top views of a prior art scanning head inkjet printer print mechanism, illustrating the initial and final positions of a printhead array.
Figure 2B:
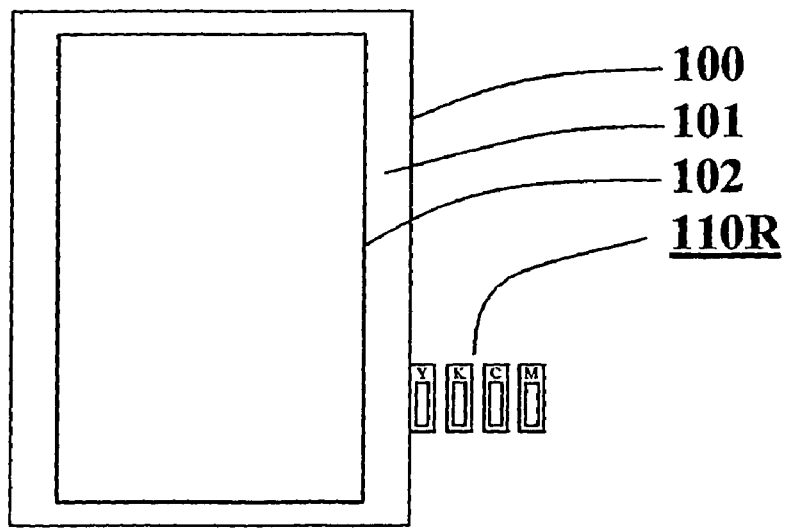

FIGS. 2A and 2B show conceptually a four color printer of the prior art, looking down on the 4 printheads (Traditionally Cyan, Magenta, Yellow and Black, CMYK as indicated on printheads 106Y, 106K, 106C and 106M) in a printhead array. When the printheads 106Y,K,C,M are scanned laterally to the right, ganged together from position 110L, they are said to scan over page (or substrate) 100 in a print swath. At the end of the scan on the right side of page 100, the printhead assembly passes beyond the printable region 102 by the width of the head assembly (overtravel), plus an additional distance for the printhead to decelerate to position 110R as in FIG. 2B. Thus the complete_swath_time for prior art printers to move from position 110L to position 110R is the sum of four measurable transit times, namely:

$T_{swath}$=printed width/velocity $T_{overtravel}$=2·overtravel distance/velocity $T_{deceleration}$=velocity/acceleration $T_{acceleration}$=velocity/acceleration     (Equations 1)

with $T_{swath}$ being the time to transit printable region 102; $T_{overtravel}$ being the time to transit the overtravel distance with a factor of two being applied since there is an overtravel distance to be accounted for on both the left and right sides of printable region 102; $T_{deceleration}$ being the time to transit the distance beyond the overtravel distance to decelerate to position 110R in this example; and $T_{acceleration}$ being the time to transit the distance from the point of rest before the scan, point 110L in this example, to the beginning of the overtravel distance transited on the previous scan to decelerate to position 110L.

The time to print an entire black only page is approximately the number of swaths per page times the complete_swath_time, plus the paper advance time (if it isn't advanced during the acceleration and/or deceleration times). When printing pages in color with prior art printers, often each swath is repeated multiple times in an interlaced fashion to reduce the visibility of paper advance errors or missing nozzle defects, and to provide more subtlety in dither patterns. Thus for color pages the interlace factor is typically 3 to 8 as opposed to 1 when printing black only, thus the print time for color printing is longer than for black text because the increased interlace factor is greater; because bidirectional printing results in different shades depending on the print direction (hence unidirectional printing is used, and the retrace time is wasted); and because of the overtravel associated with the 4 colors of the printhead is much larger, and contributes still more to the complete swath time.

Generally, in scanning head inkjet printers, increasing swath height and printing velocity are the highest leverage variables to increasing print speed, but they are also extremely expensive to change, since they require very expensive tooling changes for the printer and the printhead, or, in the case of swath height, expensive silicon area changes to the printhead. Another design variable of importance is the overtravel, which must be at least the distance separating all the printheads (i.e., distance from the nozzle array of the left most printhead to the nozzle array of the right most printhead). If the 2∘overtravel is comparable to the printed width, then about as much time will be spent in non-printing motion as in printing motion. Therefore it is desirable to reduce 2∘overtravel distance to much less than the printed width.

Most of the embodiments below employ a feathering technique to make the boundary between regions printed with separate printheads, or at a different times, not visible to the eye. The feathering technique is as follows:

A. Adjacent printable regions are slightly overlapped in a small transition region.

B. In the transition region, the dots to be printed are a combination of dots from the two printheads, one for each of the adjacent print regions on the sheet. When there are only two print regions on the sheet they are the left print region printhead and the right print region printhead (top and bottom printheads in the case of horizontal transition regions).

C. The fraction of dots in the transition region printed from the left print region printhead are gradually decreased (as viewed from left to right) according to a formula, analytically or experimentally derived, as part of a method, as described below in the second embodiment.

D. The fraction of dots in the transition region printed from the right print region printhead are gradually increased (as viewed from left to right) according to a similar formula, analytically or experimentally derived, as part of a method, as described below in the second embodiment.

E. Generally, in the transition region, the fraction of dots printed by the left print region printhead plus the fraction of dots printed by the right print region printhead exceed a total of 1.0 (i.e., exceed the number of dots that would have been printed had the region been one continuous region that was printed by a single printhead all at once).

F. The dots printed in each of the left and right print region are printed using any halftone mask with the mask being different for each of the left and right print regions. The two masks are designed to be uncorrelated—which has the practical effect that changing misalignments between the left and right print region printheads do not result in different densities to the eye. The simplest way to generate uncorrelated halftone masks is to base them on pseudo random numbers generated with different seeds.

The feathering technique specified above is illustrated in summary in FIGS. 28 A-F. In these figures, a 200 pixel wide portion of a 4800 pixel wide page spanning a transition region with uniform density of 0.9 is to be printed with the printable region of a sheet that is divided into two virtual printable columns with a narrow transition between the two columns using a left printhead and a right printhead (see FIG. 4A), with each of the left and right printheads each disposed to print in an overlap region (i.e., the transition region) that is 80 pixels wide (from the 60 to 140 pixel position as depicted in FIGS. 28A-C). A previously determined feathering function Alpha l (illustrated in FIG. 28A) for use with the left printhead determines what fraction of the 0.9 density is to be printed with the left printhead as a function of position in the transition region. Similarly, a previously determined feathering function Alpha r (illustrated in FIG. 28B) for use with the right printhead determines what fraction of the 0.9 density is to be printed with the right printhead as a function of position in the transition region.

Figure 28A:
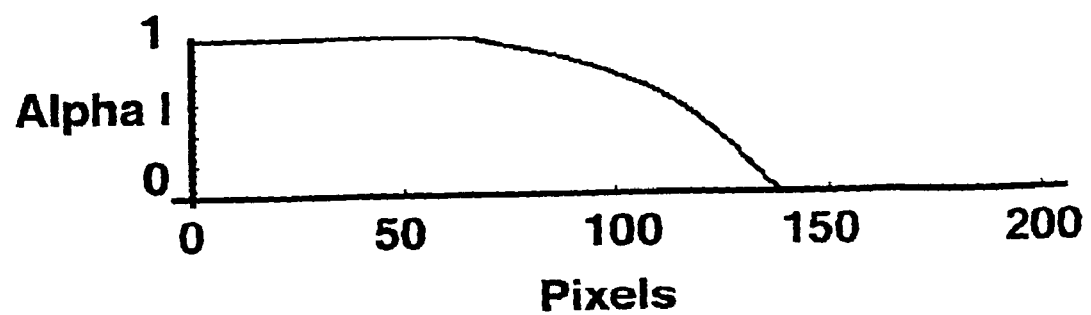
FIG. 28A shows the function Alpha l in a region that includes a transition region.

It can be seen from FIG. 28A that Alpha l (i.e., the fraction of dots printed by the left printhead) remains constant in the left column printable region where only the left printhead can print, whereas in the transition region Alpha l decreases, eventually to zero, when the transition region is viewed from left to right. Similarly, it can be seen from FIG. 28B that Alpha r (i.e., fraction of dots printed by the right printhead) increases from zero in the transition region when viewed from left to right to a constant level in the right column printable region where only the right printhead can print, substantially the inverse as for the left printhead. (It needs to be kept in mind that the functions Alpha l and Alpha r are not necessarily the exact inverse of each other since they will not be the same as stated in F. of the above discussion of the feathering technique.)

Figure 28B:
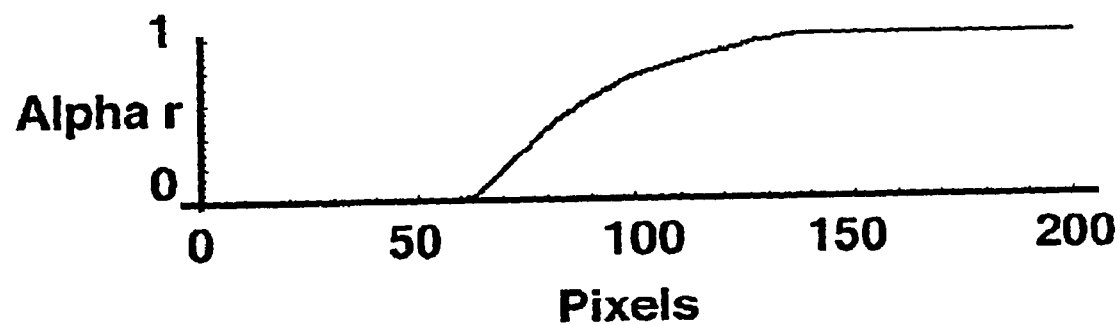
FIG. 28B shows the function Alpha r in the same region as depicted by FIG. 28A.
Figure 28C:
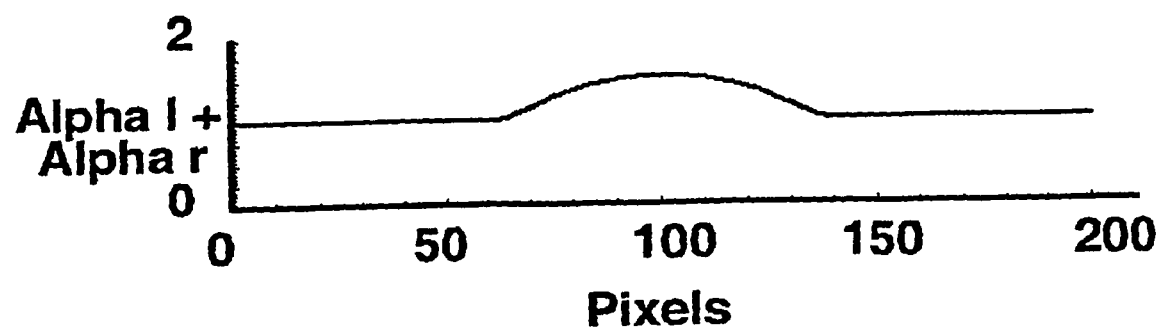
FIG. 28C shows the sum of the Alpha l and Alpha r functions in the same region as depicted by FIGS. 28A and 28B.

In FIG. 28C the sum of the Alpha l and Alpha r functions is plotted, where it can be seen that in the transition region the sum of the two functions is greater than either of the Alpha functions individually in the regions where only the one printhead can print as stated in E. of the above discussion of the feathering technique.

Figure 28D:
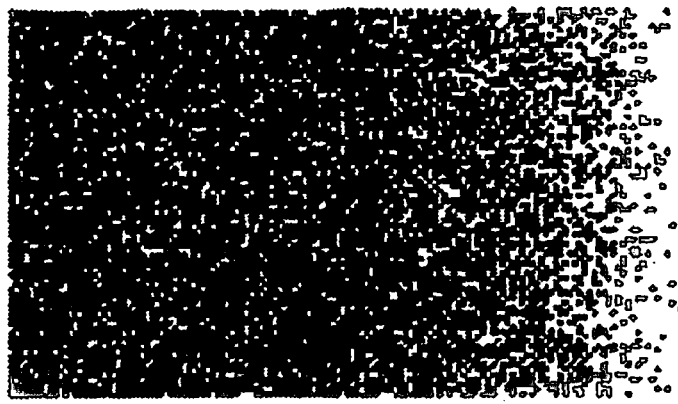
FIG. 28 D shows the dots printed by a left printhead using the Alpha l function of FIG. 28A and in the same region depicted by FIG. 28A.
FIG. 28F shows the superimposed printing of the dots in FIGS. 28D and 28E.

FIG. 28D illustrates the resultant dot pattern printed with the left printhead in the pixel region depicted in FIG. 28A (that includes the transition region), using a halftoning algorithm based on a pseudo random mask that is the result of halftoning 0.9∘Alpha l.

Figure 28E:
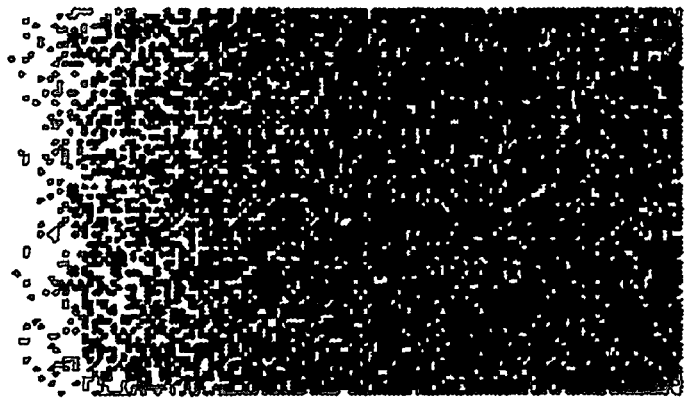

Similarly, FIG. 28E illustrates the resultant dot pattern printed with the right printhead in the same pixel region as also depicted in FIG. 28B (that includes the transition region), using a halftoning algorithm based on a different pseudo random mask that is the result of halftoning 0.9∘Alpha r.

Figure 28F:

When the resultant dot patterns from the left and right printheads as shown in FIGS. 28D and 28E are superimposed on the page, the resultant pattern is that in FIG. 28F. This is a somewhat surprising result since the fraction of dots in the center of the transition region, as shown in FIG. 28C, is 1.5 times the number of dots that would have been printed to obtain a similar density in a region that is not in the transition region.

In a normal image, the to-be-printed image is non-uniform. Nevertheless, the procedure is the same. At every position, multiply the target image density by the appropriate Alpha l (for the left printhead) and Alpha r (for the right printhead); and halftone the result with uncorrelated masks for the left and right regions. Alpha l and Alpha r are functions of both the local density and the horizontal position in the transition region as will be seen in the following discussions.

First Embodiment-Black Single Sided Printing with Two Print Columns

The first preferred embodiment of the present invention to be described below enables the use of existing technology printheads, while at the same time increasing the black print speed by a factor of 2 over that of the prior art configuration shown in FIGS. 2A and 2B; and FIGS. 3A and 3B in a simple, and novel way. Variations and combinations of the present invention described below can increase print speed by a factor of 3 to 96 times over prior art implementations, at little cost increase over that of the prior art.

The various additional preferred embodiments use additional printheads, or additional printhead arrays, to print on the page, dedicating various printheads or printhead arrays to corresponding parts of the page. The technique of the additional embodiments is most useful when the overtravel time ($T_{overtravel}$) plus the acceleration and deceleration times ($T_{acceleration}+T_{deceleration}$) of the printhead, or printhead array, is much less than the printed swath time ($T_{swath}$) for each printhead assembly.

The first preferred embodiment of the present invention is exemplified by the following implementation which is applicable to printers that print on typical office paper (e.g., 8½"× 11" paper), and is easily generalized to any scanning head inkjet printing system, whether it jets fluid on paper, fabric, biological materials or other substrates.

If the usual prior art print head array is built with 4 printheads on 0.75 inch centers in a YKCM order, the first embodiment of the present invention is equipped with 5 of the same type printheads on 0.75 inch centers, with a printhead order of KCYMK (i.e., with the black printheads on the ends of the printhead array). This would have a spacing between the black printheads of 4×0.75 inch=3 inches, which is about half the normal printed width on business documents in printable region 102.

For example, FIG. 2A (prior art) shows the printable region 102 of a 4 color inkjet printer schematically, with the 4 color heads 106Y, K, C, M fully off the left edge of the paper 100. The width that the printhead array in position 110L extends past the edge of the paper width, the overtravel distance, is equal to the width of the printhead array nozzle region.

FIG. 2B (prior art) shows that same print head array at position 110R after having printed a swath, and momentarily at the right end of its scan. In color printing, the complete printhead array must extend beyond the printable area 102.

Figure 3A:
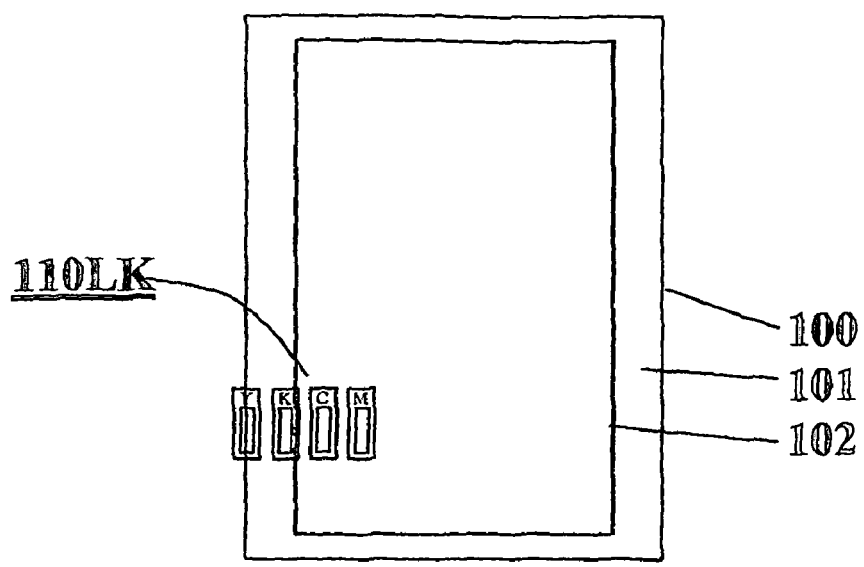
FIGS. 3A and 3B show simplified top views of positions of the prior art printhead array when the inkjet printer is only printing black text.
Figure 3B:
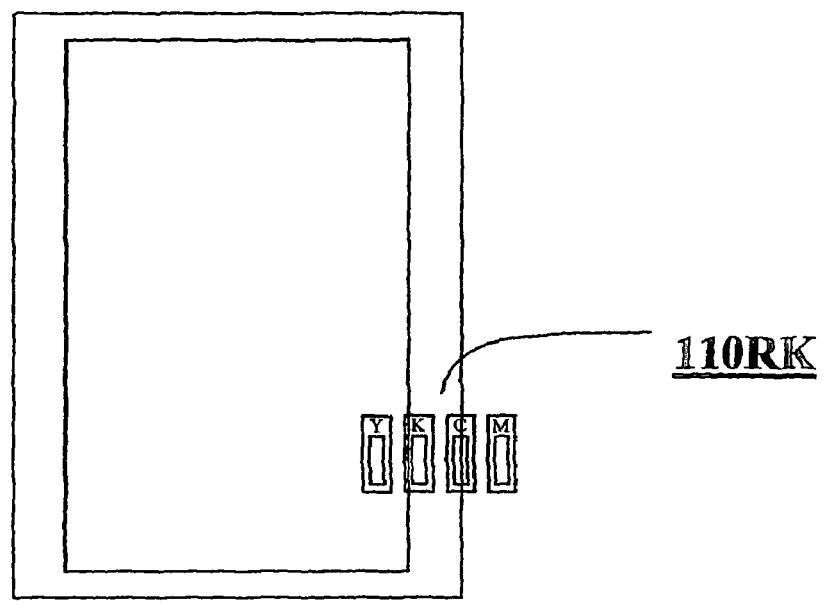

However, if this same printhead array is printing only black text, then the printhead array does not have to scan as far as shown in FIGS. 2A and 2B, rather the left and right positions on black only printing in the prior art would be as shown in FIGS. 3A and 3B (prior art). In the black only printing case, the printhead array at position 110LK in FIG. 3A need only travel between the margins of page 100 to position 110RK, and, more importantly, there is no additional overtravel required as there is with respect to color printing. The scanned printhead array carriage travel distance equals the width of printable region 102 of page 100, plus a small amount required to accelerate the printhead array to its printing speed, which is dot frequency/dpi (i.e., dots per inch), which is typically 18,000 dots per second/600 dpi, or 30 inches per second (ips).

Figure 4A:
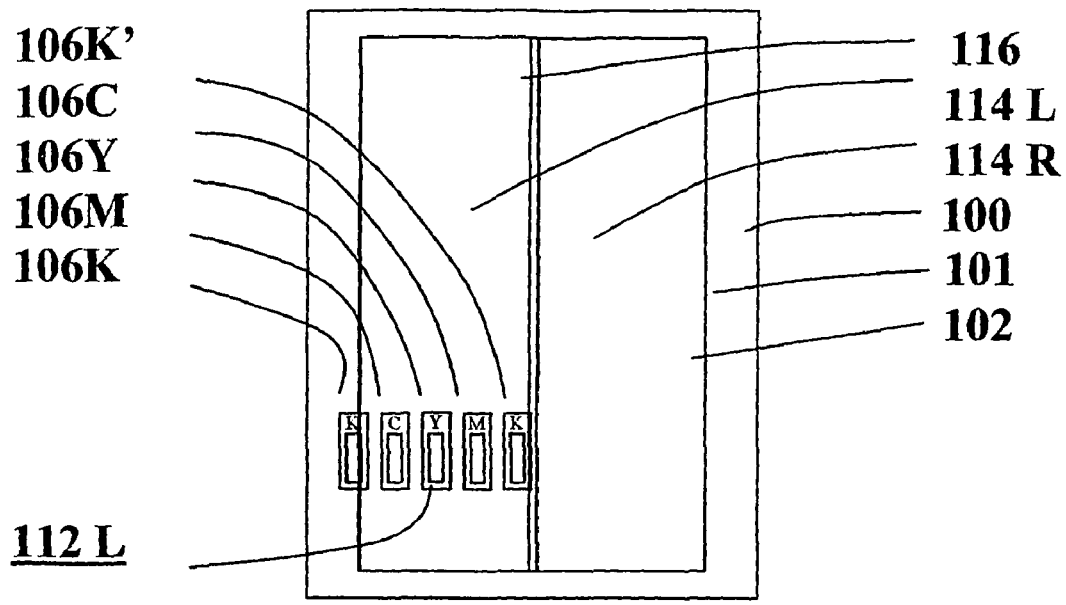
FIG. 4A shows a simplified top view of a scanning head of an ink jet printer of the present invention incorporating a first embodiment of the present invention for positioning the scanning inkjet print mechanism relative to a substrate (e.g., sheet of paper) in a scan starting or ending position at the left side of the printed region of the substrate.
Figure 4B:
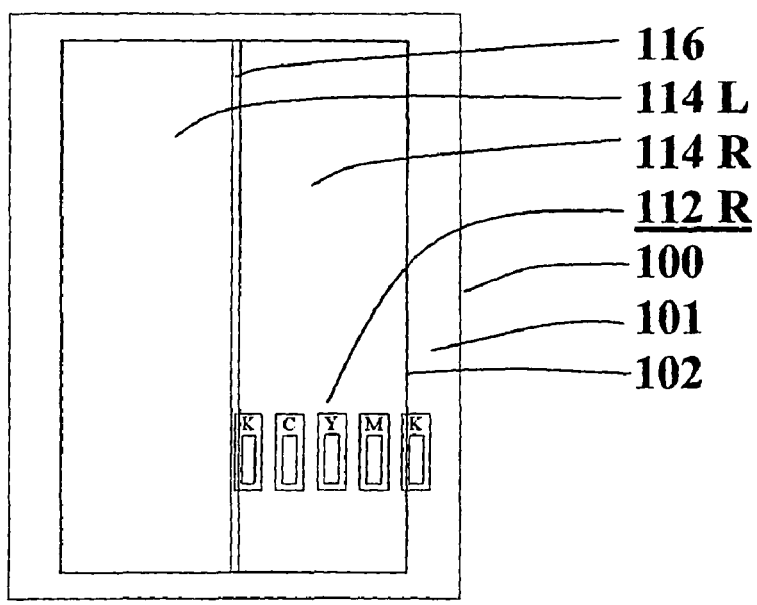
FIG. 4B is similar to and complements FIG. 4A also incorporating the first embodiment of the present invention, showing the scanning inkjet print mechanism relative to a substrate in a scan starting or ending position at the right side of the printed region of the substrate.

FIGS. 4A and 4B illustrate the first preferred embodiment of the present invention. In FIG. 4A the printhead array includes printheads 106K', 106C, 106Y, 106M and 106K, in that order from left to right, where 106K and 106K' are equivalent black printheads, and that array is located at position 112L with black printheads 106 K' and 106K on each end, approximately 3 inches (center-to-center) apart from each other. When printing black text in a region that is about 6 inches wide, as would be typical on an 8.5 inch wide piece of office paper 100 with about 1 inch margins, it is necessary for the printhead array of the first embodiment of the present invention to move only 3 inches (plus a small additional distance to accelerate the printhead array) to print a full swath across printable region 102. FIG. 4A shows printhead 106K in the left margin just outside printable region 102 with the printhead array at position 112L at its left extreme position compared to the printable region 102; while FIG. 4B shows printhead 106K' in the right margin just outside printable region 102 with the printhead array at position 112R at its right extreme position compared to the printable region 102. In viewing FIGS. 4A and 4B it can be seen that the distance the printhead array has traveled, with black printhead 106K having printed region 114L of printable region 102 and black printhead 106K' having printed region 114R of printable region 102, and both printheads 106K and 106K' having printed in overlap region 116 in the center of printable region 102. Since, in this example, overtravel time is approximately 0, and acceleration time is small compared to swath time, reducing the Complete_swath_time by almost a factor of 2 from that of the prior art reduces the overall printing time by a similar factor.

Thus the addition of a single black printhead by the first embodiment of the present invention to a 4 printhead array of the prior art, and changing the printing algorithm so that each of black heads 106K and 106K' print on their respective sides of the paper rather than using a single black printhead to print totally across the page can double the print rate over that of the prior art, with little additional cost, and little printer, and no printhead redesign.

Alternatively, if the printer is only to be used for black printing (no other colors) printheads 106C, 106Y and 106M could be omitted while keeping black printheads 106K' and 106K mounted on 3 inch centers as described above which will present the same time savings as discussed above with the 5 printhead configuration shown in FIGS. 4A and 4B.

In printing black text, the printer mechanism of the present invention may be built precisely enough that no printing gaps will be visible in the overlap region 116 between left and right print regions 114L and 114R. However, when printing a grey tone, overlaps or gaps may be visible which can be overcome with the use of a novel print algorithm for the printheads, described below for color printing, to hide any errors in printing in the overlap and transition region 116.

Second Preferred Embodiment-Color printing

The concept of the present invention can be generalized to color printing as well. To print color, one replicates the printhead arrays, so there is one array for each region of the paper. To be effective in improving speed, each printhead array must be less than about half of the width of the subsection of the paper that it is designated to print, and printer acceleration should be fast enough so that printhead turnarounds (i.e., direction reversals) do not dominate print time. Thus, a page could be divided into 2 or more columns, each of which to be printed by a corresponding print head array.

Figure 27:
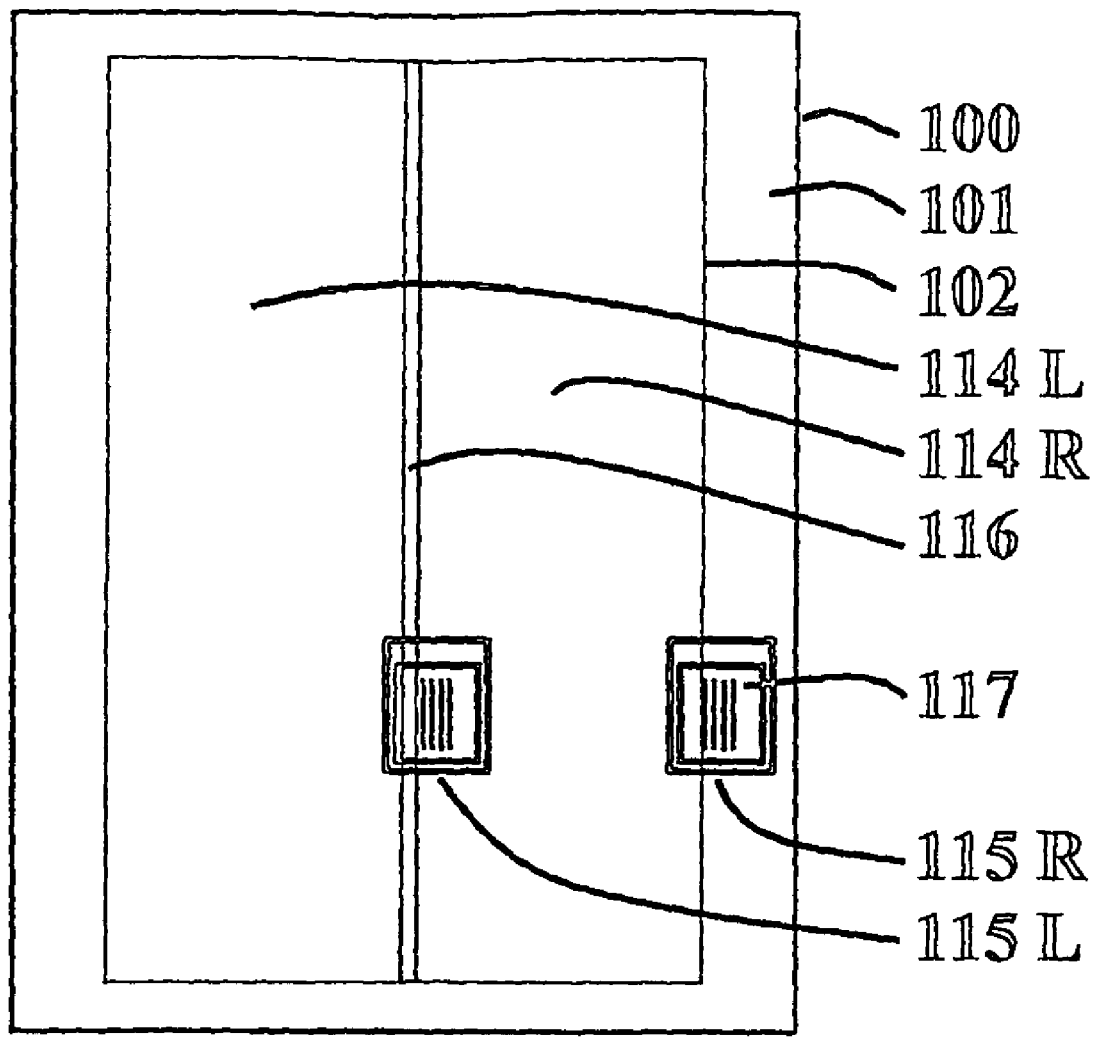
FIG. 27 shows a simplified top view of the printheads in a 4 color printer capable of printing 2 regions simultaneously.

FIG. 27 shows a simplified top view of an inkjet printer for 4-color printing only on sheet 100 with margins 101 and printable region 102. Printable region 102 is shown schematically with two printable columns (114L and 114R) and a transition region 116 between the two columns. Additionally, there are two scanning printheads (115L and 115R) each including four ink tanks and corresponding individual print nozzle plates 117 at the right most scan printing starting position. In each of printheads 115L and 115R the four print nozzle plates 117 are depicted as parallel vertical straight line segments. The left most print nozzle plate 117 of printhead 115L is substantially aligned with the right edge of transition region 116 while the left most print nozzle plate 117 of printhead 115R is substantially aligned with the right edge of printable region 102 (column 114R). Printheads 115L and 115R when in their left most printing starting position will have the right most print nozzle plate 117 of printhead 115L substantially aligned with the left edge of printable region 102 (column 114L) while the right most print nozzle plate 117 of printhead 115R is substantially aligned with the left edge of transition region 116. In each scan all four print nozzle plates 117 of each of printheads 115L and 115R pass over, printing when excited, in their corresponding column 114L or 114R (i.e., left to left and right to right), plus all four print nozzle plates 117 of each printhead 115L and 115R pass over transition region 116, printing when excited. An example algorithm the second embodiment of the present invention is described as follows.

Printhead arrays exist today that use a variety of configurations including:
  A. Separate cartridges with their own heads for each of C, Y, M, K (and possibly C, M', G, O, K' and K" (here O refers to orange, and G refers to green);
  B. Separate K cartridge with integral printhead, and one or two multi-color cartridges, one configured as C, Y, M and optionally a second configured as C', Y, K';
  C. Single multi-color cartridge with C, Y, M, K and a single printhead.

These prior art print head configurations may be either on-axis (meaning containing their own integral ink supply) or off-axis (meaning ink is supplied to the print head via some mechanism, typically a hose, from a stationary supply).

Ideally, the cartridge and printhead array configuration would be chosen so the distance from the furthest apart nozzles in the printhead array is as small as possible, allowing the profitable use of more printhead arrays and corresponding paper regions, still meeting the constraint that the printhead array overtravel is much less than the corresponding print region width.

Figure 21:
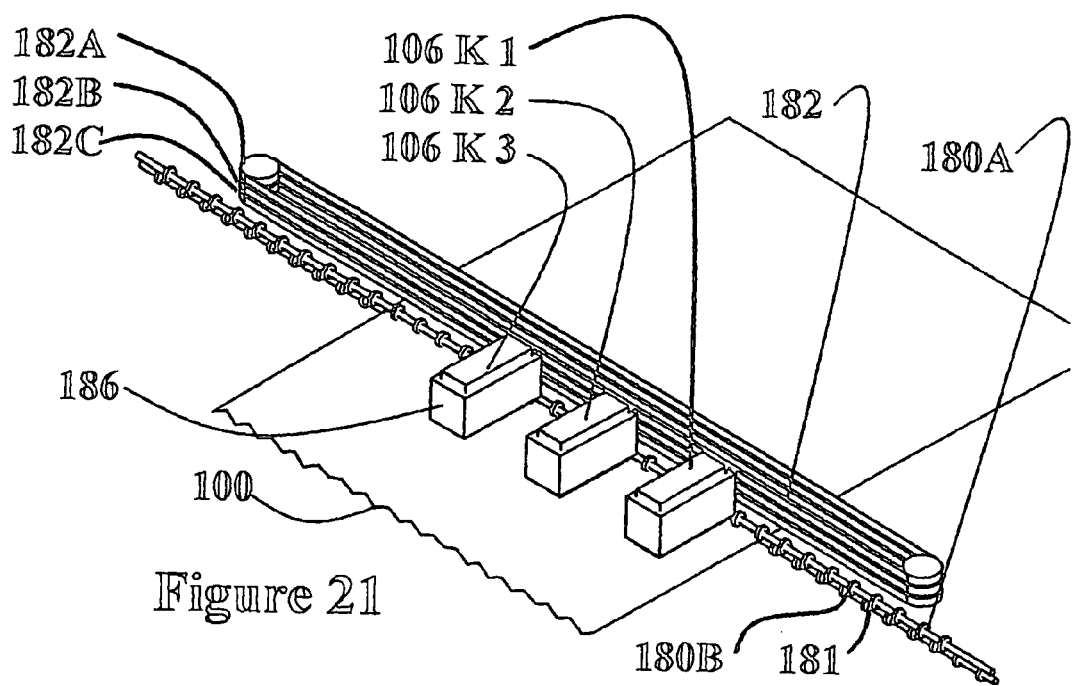
FIG. 21 shows a simplified perspective view of a third alternative of the third embodiment of the present invention, with the printheads mounted individually, and controlled individually by separate drive belts, a novel paper drive mechanism.

For the first and second embodiments discussed above, as well as other embodiments discussed below, if the printer is only to print a fixed width printable region with a fixed number of printable columns, the printhead arrays (one for each printable column) can be mounted a fixed distance apart from each other on the same drive mechanism (e.g., a drive belt). To give the printer end user more flexibility and allow the user to define different width printable regions, as well as different width printable columns, each of the printhead arrays with which the printer is equipped could be fixed to separate drive mechanisms (e.g., multiple belts as shown in FIG. 21 which is discussed below). In either case, the operation will be the same as described.

In the second embodiment of the present invention, for 2 or more columns, or more generally, print regions, with corresponding black and color arrays assigned to printing those columns, or, more generally, regions. Print regions typically will be rectangular, or alternately could be chosen to have jagged edges to provide a butting region that avoids difficult in hiding features such as high spatial resolution detail.

Theory of Operation for Color Printing

The key to the successful color implementation with the use of separate printheads or printhead head assemblies for scanning corresponding regions is accurate color matching of the printhead assemblies together with no apparent gaps, lines, or changes in color at region boundaries. The following describes design directions and calculation principles, and methods of the present invention which allow seamless butting of the print regions. Though this butting algorithm is first discussed in the context of scanning head inkjet printers which are dividing up the page in the scan axis direction, the same algorithm is also useful for:

A. minimizing line feed print artifacts in scanning head printers—and therefore enabling less interlacing for a given print quality, and therefore further increasing speed;

B. minimizing the butting errors in segmented head page width arrays; and

C. minimizing moire effects in any print process were two layers are successively printed on the same region. This could occur, for example, in printing shingled color patterns bidirectionally because the offsets of one set of color dots relative to another from scanning in one direction would be different than the offset between different color dots in the other direction.

Printheads and printhead arrays may be manually or automatically aligned so their corresponding adjoining regions appear nearly seamless, and print algorithms adjusted to hide residual butting errors. The overall process for achieving highest quality results includes:

A. Subject to cost constraints, improve the mechanical accuracy of the carriage scan and paper advance mechanisms, and improve the color accuracy and stability of the individual printheads;

B. Correct as much residual positional or drop volume inaccuracy as is economically reasonable with a feedback mechanism (manual, or automatic and built in), subject to cost constraints; and C. Use printheads and print algorithms that, for color, use 2 or more of the same color dots on a paper pixel to obtain full saturation of that color (this is called multi-level printing). Alternatively stated, for each pixel and each color, have an inherent density of at least 3 levels (0, 1, or 2 drops on the pixel). The more levels used, the less image noise and butting artifacts achievable.

Because the mechanical tolerances of the printers, even with feedback, cannot economically be made so that the raster printed by the left printhead array is perfectly aligned with the raster of the right printhead array to less than, say 1/10 dot diameter in both the scan and print axis, a transition region is needed to feather from printing the left raster to printing the right raster. By experimentation it has been determined that the transition should be 10 to 40 times the width of the maximum raster error anticipated. For example, for 600 dpi resolution, with 1 dot raster residual placement error, the transition region would be 40 dots at 600 dpi, or about 40/600 or about 0.067 inches wide. In that transition region, a pixel or dot that would have been printed in that region could be printed by either the left printhead array, or the right printhead, or both, as described below.

To minimize the effects of any remaining inaccuracy,

A. optionally, if possible, define the boundary between the left and right printed regions to areas that are insensitive to placement errors of the right and left (for example, all white areas), while still keeping the left and right print regions approximately the same width. For example, black text on a white background would be printed by shaping the print zones boundary to go between the letters;

B. hide print artifacts through the use of algorithms that spread the error through the transition region in a way to which the human eye is not sensitive.

Therefore ways to improve color uniformity through the transition region include various combinations of the following:

A. Use of very accurate and stable lead screw mechanisms and or carriage position feedback mechanisms such as optical position encoders, providing accurate head positioning on the order of a few dots;

B. Use of manual or automatic sensing of printing errors on test substrates, and feeding back color corrections to the print mechanism tables and formatters;

C. Use of interlacing patterns, and overlapping scans;

D. Use of dither patterns or other color mask algorithms with little short range order;

E. Adjusting the print overlap region boundary so print overlap regions do not include hard to hide overlaps. In general, this would mean performing the overlap if possible in regions of less than 70% color saturation if possible, and in areas of relatively low spatial frequency content;

F. Use vertical shifting of the patterns to compensate for printhead vertical alignment:
     a. In the case of partial row offsets (vertical offsets) use a combination of:
       i. Dot size modulation (when available);
       ii. Number and placement of dots (dither and error diffusion patterns);
       iii. Use Additional colors (C' and M') to fill in;

G. Use "showerhead" nozzles with built in offset tolerant patterns, such as discussed in U.S. Pat. No. 6,354,694;

H. Use of process grey instead of grey comprised of black dots on a white background;

I. Use multiple dots on a single resolution element to make a single saturated color, thereby allowing lower image noise, and providing more color values, and hence more flexibility in matching overlapping region colors to adjacent regions.

Print Algorithms

Generally the details of the method used depends on:

A. The resolution and positional accuracy of the carriage mechanism, and the, color accuracy and stability of the printheads used initially;

B. The ability to correct for positional accuracy errors either manually or automatically;

C. The pattern to be printed;

D. The number of colors available in the printhead assembly.

After having chosen a method for minimizing the offset of the right raster from the left raster, and matching the color tables of the right i;lnd left printheads so that they each print the same colors throughout the color range, the final step is the feathering process (a method of the present invention) which hides any residual raster offsets, regardless of what constitutes causes those offsets.

In summary, the feathering algorithm:

A. Defines a small transition region between the right and left rasters where the two rasters overlap each other;

B. Calculates two feathering functions of raster position, called Alpha l (Alpha for the left raster) and Alpha r (Alpha for the right raster) which determine the value to be printed by the corresponding printhead or printhead array at each point. Those values are F(x,y)∘Alpha l(x, F) [where F is the desired image density] and F(x,y)∘Alpha r(x, F). In this and the discussions that follow, x is the scan axis direction and y is the paper advance axis direction;

C. Use two uncorrelated stochastic dither patterns (one for the left raster, and one for the right raster) to half-tone the left and right raster pixel patterns with the desired values.

To illustrate the feathering algorithm for a light grey background color the fraction Alpha l of dots printed by the left printhead is gradually decreased from 1 to 0, while the fraction Alpha r of dots printed by the right printhead is increased from 0 to 1, symmetrically progressing from left to right across the transition region. The fraction of dots chosen from each raster changes gradually with the corresponding Alpha, with each individual dot printed or not printed according to a random halftoning mask variable chosen to have the average density at that point of the target fraction F∘Alpha l or F∘Alpha r. An unexpected result is that the sum of Alpha l and Alpha r generally add up to more than 1. For black densities over about 0.80, the fraction of black dots printed by the left printhead, and the fraction printed by the right printhead, at a given spot, could add up to almost 2 with some spots having 2 dots printed, based on a table of Alpha l (x, F) and Alpha r (x, F) generated either experimentally or analytically for each printer family.

It is important that the random variable chosen as a mask variable for deciding when to print dots from the left array be different, and uncorrelated to, the random mask variable chosen as a mask variable for deciding when to print dots from the right array as was discovered experimentally and verified by mathematical analysis. Practically, this is most easily done by using different seeds for the pseudo random number generators that generate the random mask variables for the left and right rasters. Using uncorrelated masks makes any density or color shift that might occur in the transition region completely independent of any misalignment of the raster scans in the two regions. Therefore, the color correction process in the transition region does not have to rely on knowing the offset of the rasters, or that the offset be stable with time.

Figure 5:
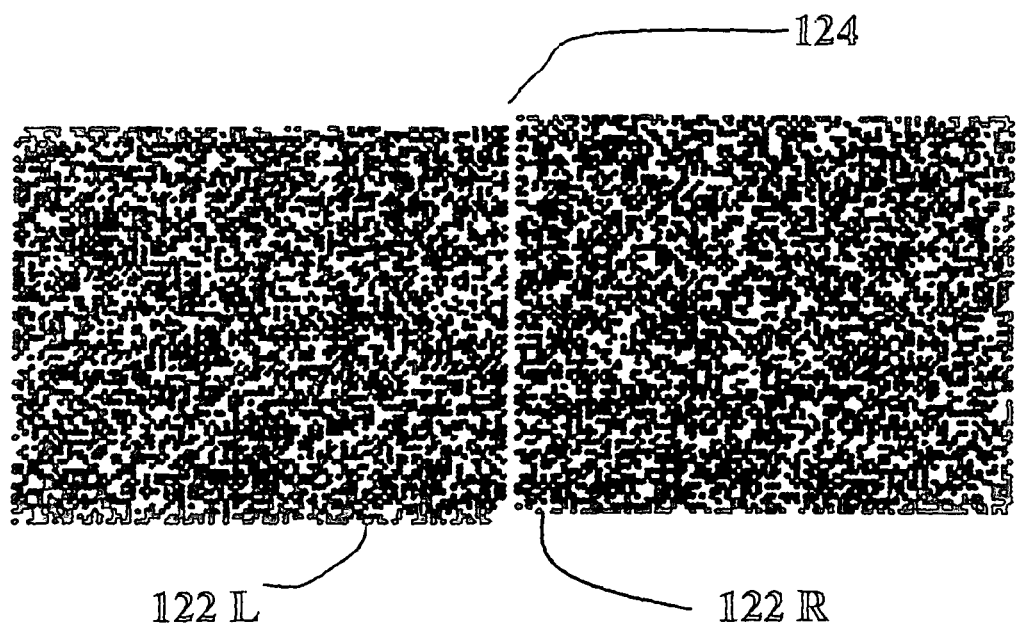
FIG. 5 shows a magnified view of the butting of a left and right raster (or columns, as shown in FIGS. 4A and 4B), with a 50% dense halftoned image, and a 2 dot row pixel horizontal offset and 2 pixel vertical offset between the left and right rasters. The image is 200 pixels wide by 80 pixels high, and is at about a 20× magnification of a 600 dpi grey image.

FIG. 5 shows the enlarged image of an 80 pixel high by 200 pixel wide printed area region of a 50% dense halftone image when two adjacent rasters 122L and 122R and are butted with a 2 pixel offset in the x direction and a 2 pixel offset in the y direction, without using the novel feathering scheme of the present invention. An unwanted white line called a band is visible from gap 124.

Figure 6:
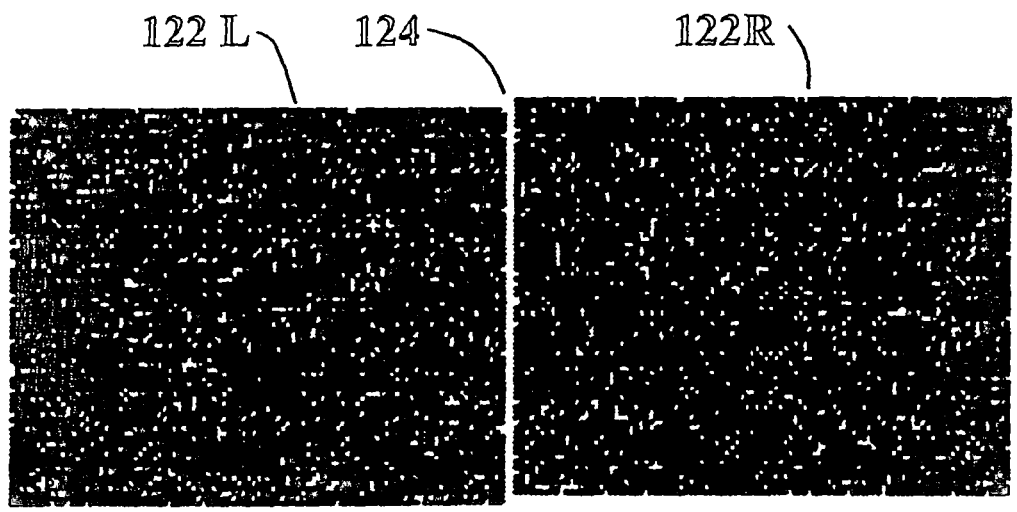
FIG. 6 shows the same conditions as in FIG. 5 with a 90% dense halftone image.

FIG. 6 shows the enlarged image of a 80 pixel high by 200 pixel wide printed area of a 90% dense halftone image when two adjacent rasters 122L and 122R are butted with a 2 pixel offset in the x direction and a 2 pixel offset in the y direction, without using the novel feathering scheme of the present invention. Again, a considerable band is visible from the visual perception of the gap 124.

Figure 7:
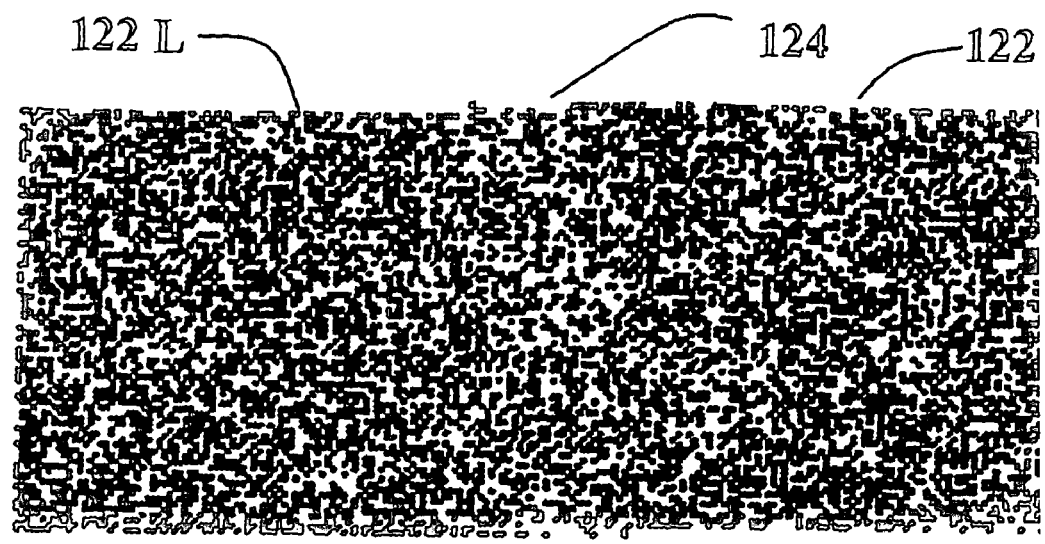
FIG. 7 shows the resultant image with the right and left rasters overlapped in a region 40 dots wide using a partial embodiment of the present invention whereby there is a gradual replacement of dots by a randomly generated, linearly increasing mask function.

FIG. 7 shows an enlarged image of a 80 pixel high by 200 pixel wide printed area with a 40 pixel wide transition region 124 of a 50% dense halftone area with a 2 pixel offset in the x direction and a 2 pixel offset in the y direction feathered using a linearly decreasing fraction of pixels from the left raster, and the same linearly increasing fraction of pixel in the right raster. In this image, the random variable used to implement the mask in the transition region 124 is the same for the left and the right raster. This image is much improved from the corresponding image in FIG. 5, however, the solution employed here does not work well for all raster offsets and for all image densities which will be seen in the discussion of FIG. 8.

Figure 8:
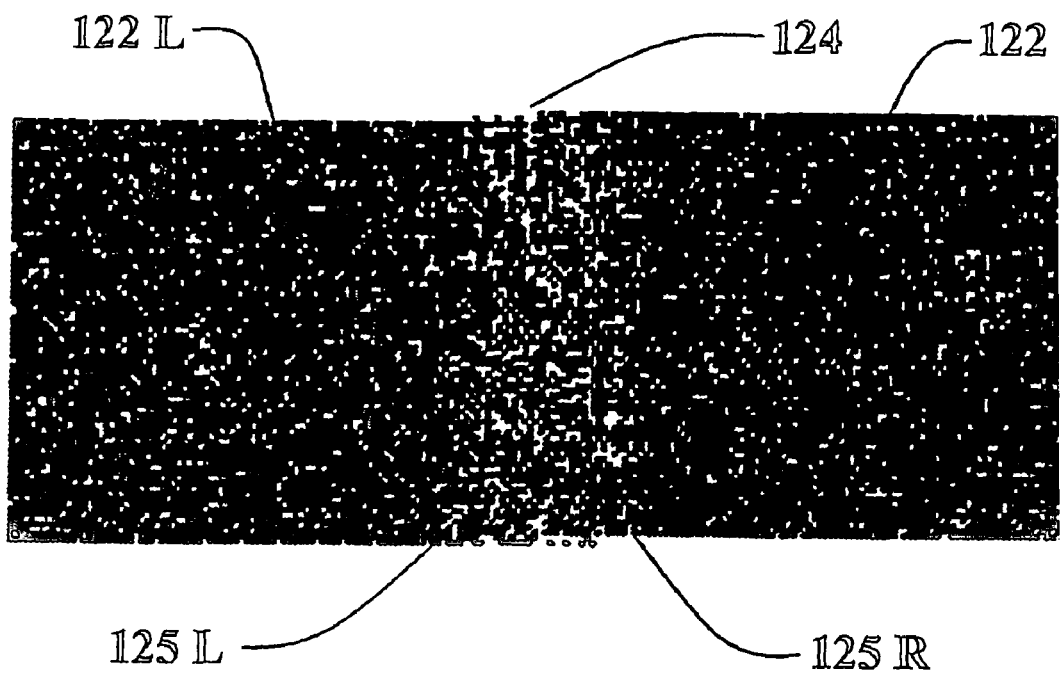
FIG. 8 shows the result when the same algorithm as used in FIG. 7 is applied to a 90% dense halftone image as in FIG. 6.

FIG. 8 shows the enlarged image of a 80 pixel high by 200 pixel wide printed area with a 40 pixel wide transition region bounded on the left by 125L and the right by 125R, and encompassing (former gap) 124 of a 90% dense halftone area with a 2 pixel offset in the x direction and a 2 pixel offset in the y direction feathered using a linearly decreasing fraction of pixels from the left raster, and the same linearly increasing fraction in the right raster. In this image, the random variable used to implement the mask is the same for the left and the right raster with the image clearly showing unacceptably large amounts of "white" in the transition region 124.

Figure 9A:
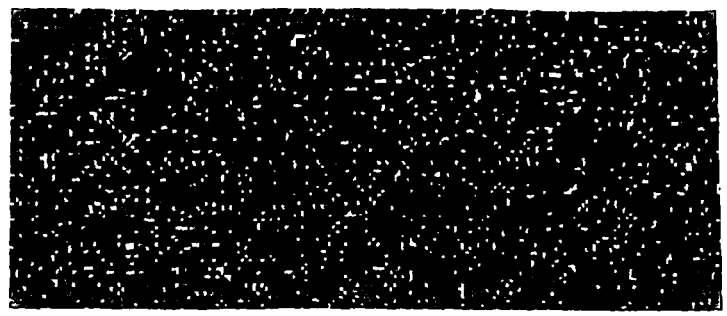
In FIG. 9A the horizontal offset is 0.4 dot increments.
Figure 9B:
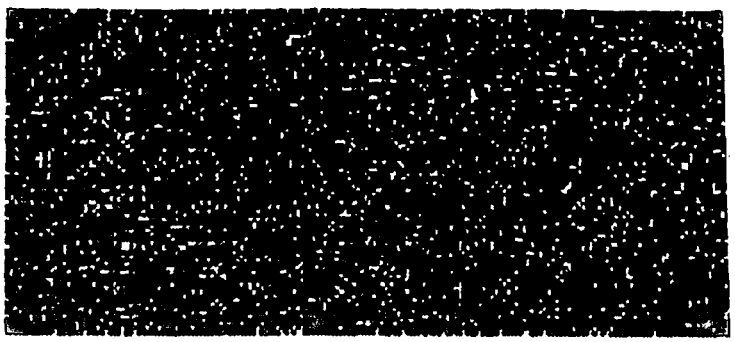
in FIG. 9B the offset is 0.8 dot increments.
Figure 9C:
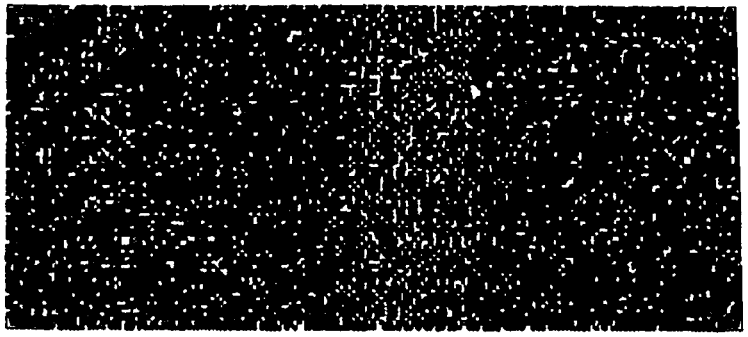
in FIG. 9C the offset is 1.2 dot increments, and in FIG. 9D the offset is 1.6 dot increments.
Figure 9D:
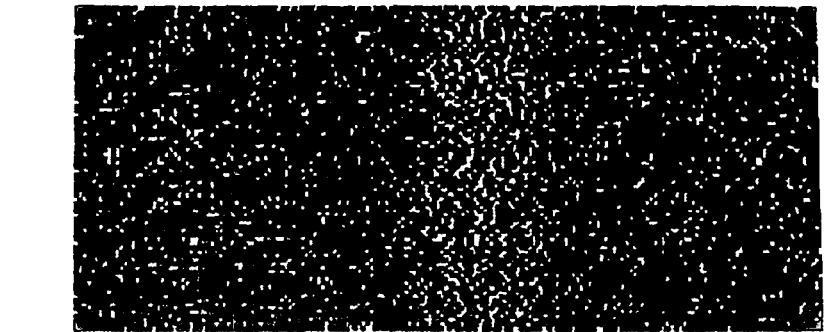
FIGS. 9 A-D illustrate the use of a replacement algorithm of the present invention that uses two nonlinear functions, Alpha l (x, F), and Alpha r (x, F) for the right and left rasters of the original images as in FIGS. 6 and 8.

FIG. 9A shows the enlarged image of an 80 pixel high by 200 pixel wide printed area with a 40 pixel wide transition region of a 90% dense halftone area with a 2 pixel offset in the x direction and a 2 pixel offset in the y direction feathered using a nonlinearly decreasing fraction of pixels from the left raster, Alpha l, and a mirror image non-linearly increasing fraction in the right raster, Alpha r. The sum of these functions (Alpha l+Alpha r) add to a value that is greater than 1. In this image, the random variable used to implement the mask is the same for the left and the right rasters. While this shows improvement over the result illustrated in FIG. 8, the result is not consistent with varying offsets used to obtain the results as shown in FIGS. 9 A-D. In FIG. 9A the offset is 0.4 dot increments; in FIG. 9B the offset is 0.8 dot rows; in FIG. 9C the offset is 1.2 dot rows, and in FIG. 9D the offset is 1.6 dot rows.

FIGS. 10 A-E show the enlarged image of an 80 pixel high by 200 pixel wide printed area with a 40 pixel wide transition region of a 90% dense halftone image with a 2 pixel offset in the x direction and a 2 pixel offset in the y direction (the toughest case) each processed with the preferred algorithm of:

A. Two different nonlinear calculated functions (Alpha l and Alpha r) that add to more than 1; and B. Uncorrelated random masks for each of the right and left rasters.

Figure 10A:
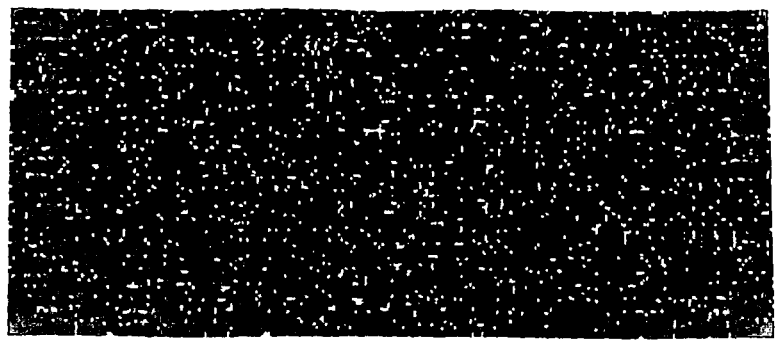
In FIG. 10A the horizontal offset is 0.0 dots.
Figure 10B:
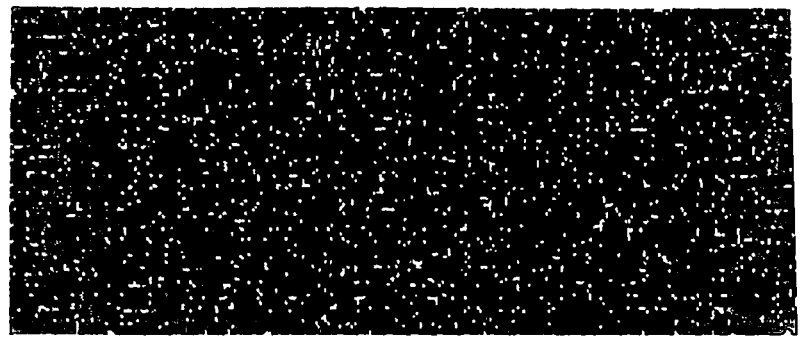
In FIGS. 10B-E the horizontal offsets are increased by 0.4 dot increments from the previous one.
Figure 10C:
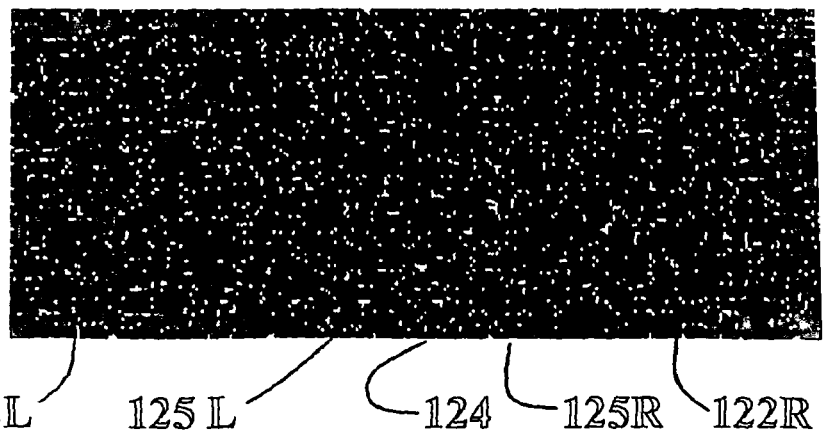
Figure 10D:
Figure 10E:
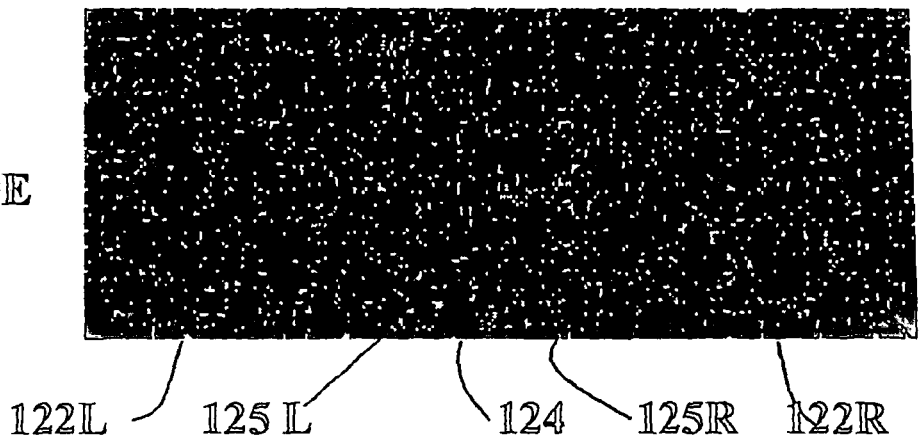
Figure 11A:
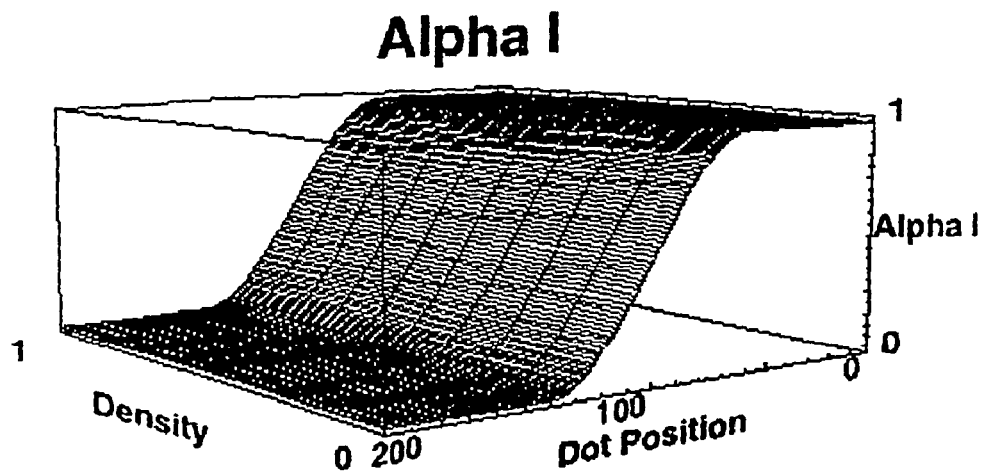
FIGS. 11A-E are plots in perspective that show iterations of the feathering function Alpha l (x,F)
Figure 11B:
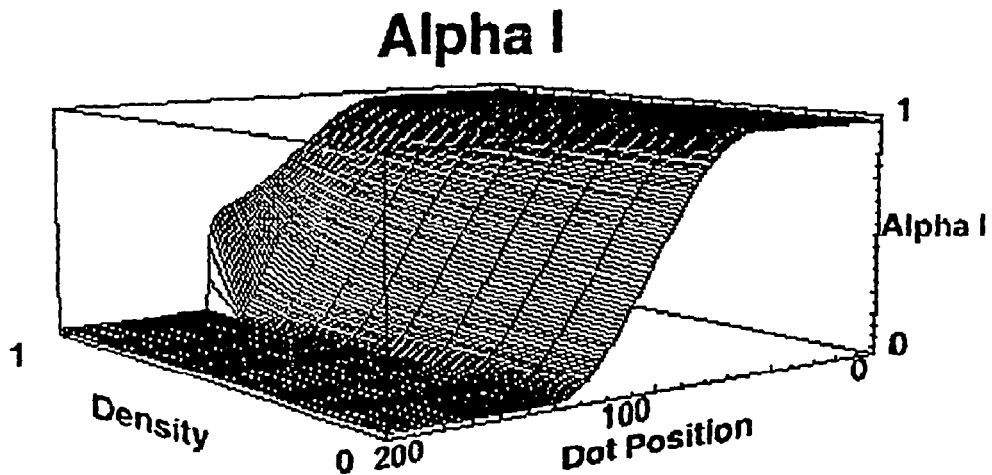
Figure 11C:
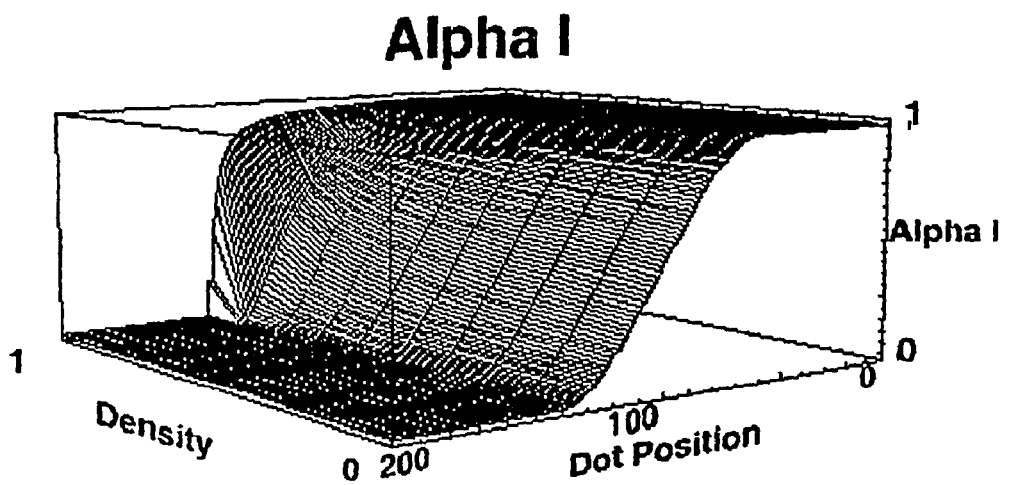
Figure 11D:
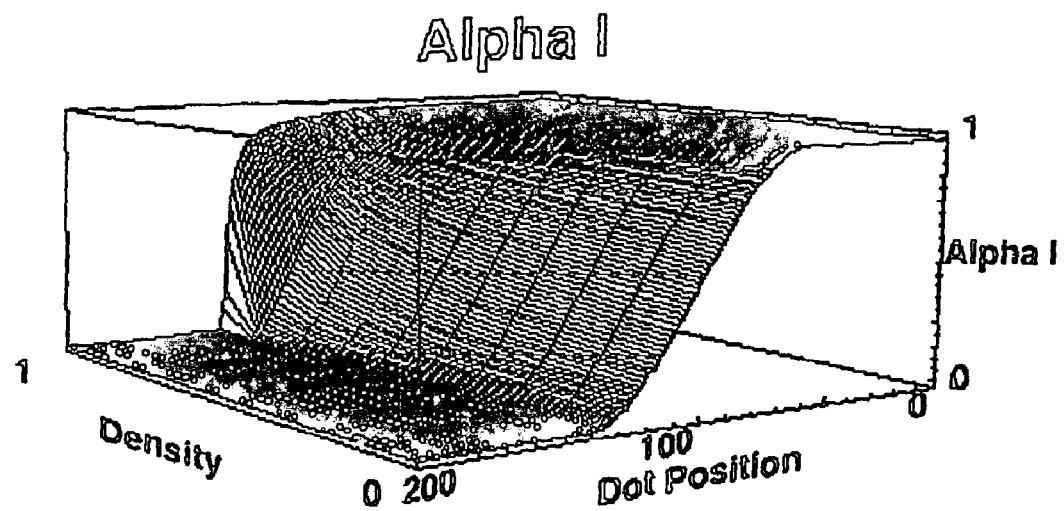
Figure 11E:
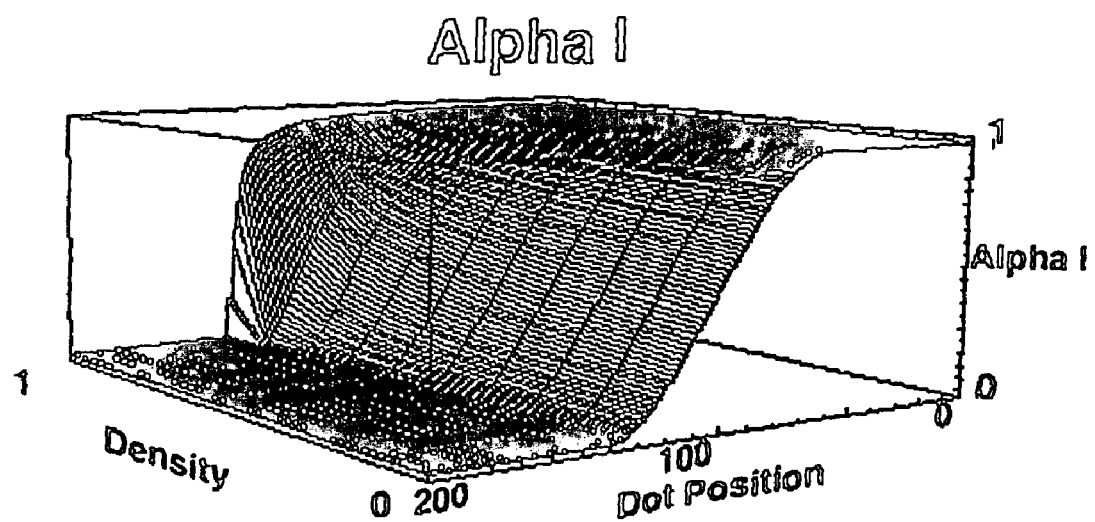

In FIGS. 10A-E, the offsets are 0.0 dots in FIG. 10A with the offset increasing by 0.4 increments in each of FIGS. 10B-E. FIGS. 10A-E show almost indiscernible butting errors, over a full range of misalignment.

Determining Alpha l and Alpha r: Analytical Calculations for Alpha

Alpha l must transition from 1 to 0 as the left raster is feathered from left to right across the transition region, and similarly, Alpha r must transition from 0 to 1 across the transition region. Initially, one might assume that these could be linear transitions—however experimentation and subsequent mathematical analysis has shown that that is only the case when there is very low color saturation.

What in fact must be done is to gradually replace dots from the left raster with dots from the right raster in the transition region. If the rasters are aligned, it does not make a difference from which raster the dots came. However, if the rasters are misaligned by, for instance, 2 pixels, when one dot from the left raster is not used, the dot that is intended to replace it from the right raster will land 2 pixels away, possibly on top of another dot from the left raster. Thus, the dot from the right raster will not contribute as much to the darkness of the region as expected. To compensate for this effect, in high density (dark) regions, the left and the right rasters, together, must have more than 100% of the dots in the transition region. By the nature of the overlap of the rasters, the two rasters, in the transition region, can together provide as much as 200% dots if necessary.

The relationship between Alpha l and Alpha r at any scan axis position x must be as follows:

$$F = F \circ \text{Alpha } l + F \circ \text{Alpha } r \circ (1 - F \circ \text{Alpha } l) \quad \text{Equation 2A}$$

Or, alternatively, $$F = F \circ \text{Alpha } l + F \circ \text{Alpha } r - F^2 \circ \text{Alpha } l \circ \text{Alpha } r \quad \text{Equation 2B}$$

Where:
F=the density desired in the region (pixels dark);
Alpha l=the fraction of pixels used from the left raster; and
Alpha r=the fraction of pixels used from the right raster.

While this gives a relation between Alpha l and Alpha r at each point in the transition region, it does not yield what either is as a function of position. However, it is known that the functions are mirror images of each other, and Alpha l equals 1 at the left side of the transition region, and 0 at the right side of the transition region, while Alpha r equals 0 at the left side of the transition region, and 1 at the right side of the transition region. One way to determine the two functions is iteratively.

Initially it is assumed that Alpha l is a cubic function that has 0 slope at the right and left edges of the transition region, and has value of 1 at the left edge, and 0 at the right edge of the transition region. (Any monotonically, gradually decreasing function is a reasonable starting point, however functions that start feathering gradually will not show a line at the transition region edge). Next, compute the corresponding Alpha r function. Although the initial assumption for Alpha l and the computed Alpha r satisfy the relationship, they would be asymmetric solutions. To obtain a symmetric solution, flip Alpha r (computed above) around the transition region midpoint, and then, average the flipped function with the previous assumption for Alpha l. Call the average a new Alpha l. Iterate the process until the functions do not change. The function Alpha l is the desired function, and its mirror image is Alpha r.

Iterations of the calculation for Alpha l (x, F) are plotted in FIGS. 11A-E.

It has been experimentally found that the method discussed above does not always converge. Another analytical method B for determining Alpha l (x, F) and Alpha r (x, F) is as follows:
A. Obtain Alpha l (F) as a function of Alpha r (F) either by equation (2A discussed above, or equation 3A to be discussed below as appropriate), or measuring color test samples as described later herein;
B. Fit a quadratic curve (which will be the left half of the function Alpha l) to the following parameters:
   a. The curve Alpha l (left edge, F) goes through x=left edge of the transition and has value 1 and slope 0, so Alpha l (left edge, F)=1; Alpha l' (left edge, F)=0;
   b. The curve goes through x=center of transition region so Alpha l (center, F)=Alpha r (center, F);
C. This fitted curve is the left half of Alpha l, and is uniquely specified by the 3 conditions above;
D. Compute the left half of Alpha r (x, F) from either equation 2 or 3, or measured data giving Alpha l (F) in terms of Alpha r (F); and
E. Compute the remainder of Alpha l and Alpha r by recognizing that the right half of Alpha l is the mirror image of the left half of Alpha r, and the right half of Alpha r is the mirror image of the left half of Alpha l.

One will recognize that this approach is one of many to generate a set of curves Alpha l (x, F) and Alpha r (x, F), and that other conditions on the initial selection of the left half of Alpha l may be appropriate. For example, instead of fitting a quadratic curve, one could choose a cubic curve with the additional constraint that the second derivative of Alpha l at the left edge of the transition region should be 0. Or, it could be insisted that there be no discontinuities of slope of the Alphas at x=center. Generally, however, the choice of the quadratic curve leads to imperceptible transitions. Finally, both assumptions could be made, and a quadratic curve used to approximate the left half of Alpha l.

Figure 12:
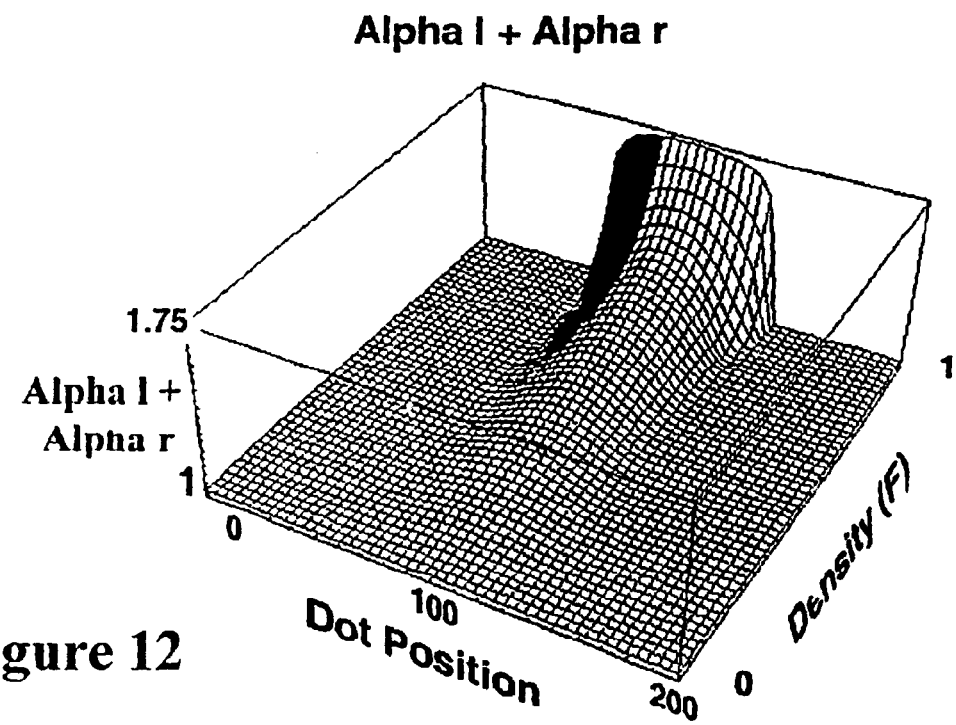
FIG. 12 is a perspective graph of Alpha l (x,F)+Alpha r (x,F) plotted against the scan axis position, x, in units of pixels and color density value, F. The transition region is between pixel locations 60 to 140, 80 pixels wide.

FIG. 12 is a perspective graph of Alpha l (x,F)+Alpha r (x,F) plotted against the scan axis position (x) in units of pixels and color density value (F) and the transition region is between pixel locations 60 to 140, i.e. 80 pixels wide. The sum of Alpha l and Alpha r (Alpha l+Alpha r) as a function of position and color density F is shown in FIG. 12, showing that the total ink used is more that 1 dot per resolution element, and higher amounts of ink are used at higher color densities (saturations) (larger F).

A modification of this procedure is required if the ink used is not opaque. In that case, if a second drop from the right raster lands on top of a previous drop from the left raster, there will be an incremental contribution, Q, to color, and the equation relating Alpha l to Alpha r above is modified to:

$$F = F \circ \text{Alpha } l + F \circ \text{Alpha } r \circ (1 - F \circ \text{Alpha } l) + F \circ \text{Alpha } r \circ \text{Alpha } l \circ F \circ Q \quad \text{Equation 3A}$$

which simplifies to $$\text{Alpha } r = (1 - \text{Alpha } l) / ((\text{Alpha } l + \text{Alpha } r \circ (1 - \text{Alpha } l \circ (1 - Q))) \quad \text{Equation 3B}$$

where the added term reflects the additional contribution of the F∘Alpha r pixels added from the right raster that land on pixels on the left (F∘Alpha l) and contribute an additional darkening Q.

Figure 13:
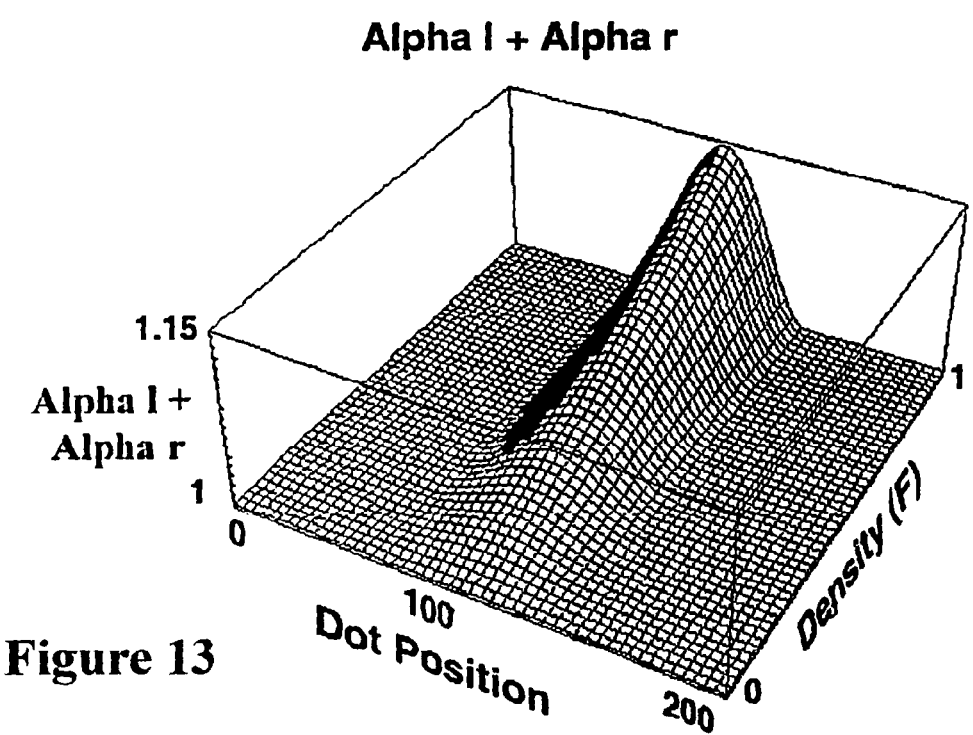
FIG. 13 is similar to FIG. 12 showing Alpha l (x,F)+Alpha r (x,F), when the pixel dots are not completely opaque. For this plot, the assumption is that the incremental absorbtion of a second dot on top of an existing pixel dot would increase by 50%.

Equation 3A is useful for computing the Alpha functions when color inks are used, which are not completely opaque. FIG. 13 shows Alpha l and Alpha l+Alpha r with Q=0.5. Notice that, in the case of a larger Q, the maximum sum of Alpha l and Alpha r is 1.15, i.e., there is only a 15% duplication of dots.

It should be noted that some of the analyses above have been simplified to make them easier to understand, or to represent mathematically. Nevertheless, the conclusions are generally applicable.

Figure 15:
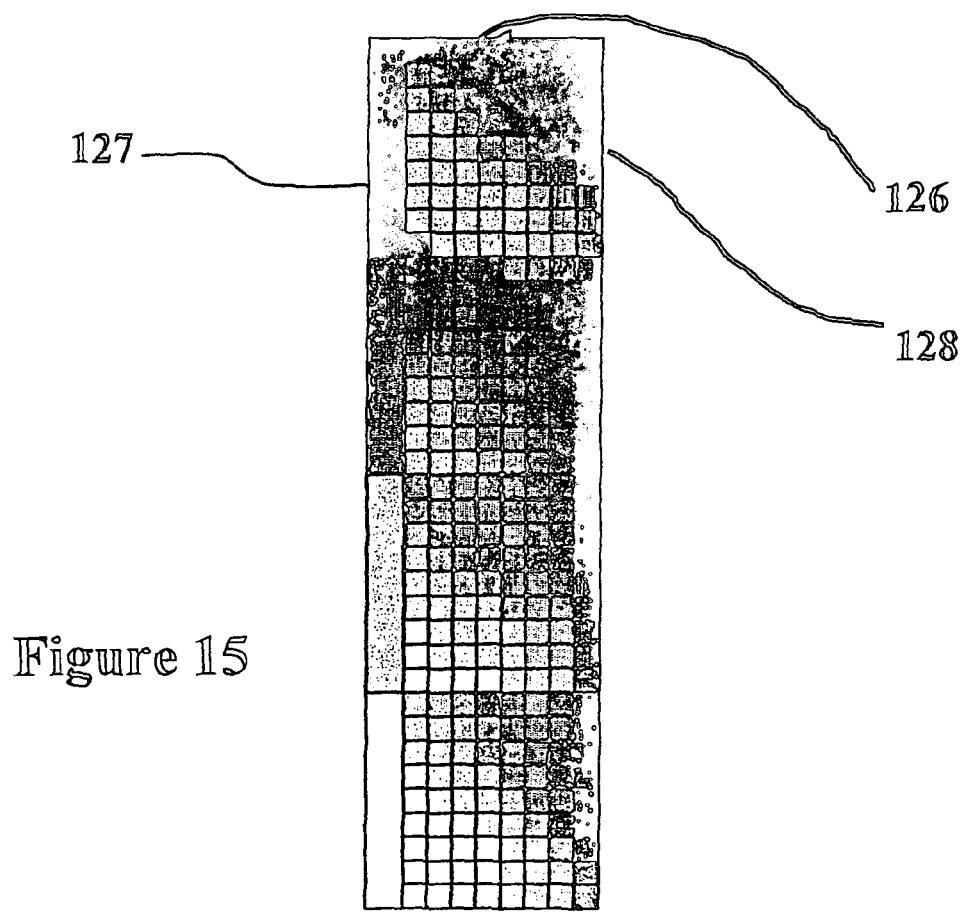
FIG. 15 is a magnified segment of test patches to be used to measure Alpha l, Alpha r pairs of a printer to be characterized.

For example, in equations 2A through 3B, that relate the desired color density F to Alpha l and Alpha r, a simplifying assumption was made that the density of the image was F, which was assumed to be linearly proportional to the number of pixels per unit area. In fact, density is generally a saturating function of F, as shown in FIG. 15.

Thus a more accurate equation than equation 3A would be:

$$D(F) = D(\text{Alpha } l \circ F) + \{1 - D(\text{Alpha } l \circ F)\} \circ (D(\text{Alpha } r \circ F) \quad \text{Equation 4}$$

where D(F) represents "the density corresponding the dot density", which is not generally not represented only by F∘Alpha.

From Equation 4, it is possible to solve numerically for a relation between Alpha r and Alpha l and F. Using that relationship, as done above, Alpha (x, F) can be derived.

Alternatively, and probably more directly and therefore more accurately, the relationships between Alpha l (F) and Alpha r (F) can be measured directly as described below. This avoids many approximations in the relations between dot density and image density.

The above method determining feathering functions, and using uncorrelated masks are suitable for binary printing (where there are either 1 or 0 drops of ink on a pixel). For black text, this is commonly done today; however for color and frequently grey images, more than one drop is frequently used on a pixel to gain more saturated colors, and less noise.

In most cases prior art printers interlace and "shingle" color patterns, especially in higher quality print modes. For example, to print a high density cyan color, a printhead would fire, for example, every third nozzle along the nozzle array at a time, throughout the horizontal scan, then index the paper by $\frac{1}{3}^{rd}$ swath height and scan a second time, and then index and scan a third time (interlacing). At the end of this process, one third of a full swath height would have been completely colored in, and areas above that colored swath would have been partially colored in. Interlacing refers to the $\frac{1}{3}^{rd}$ swath advance; shingling refers to staggering which $\frac{1}{3}^{rd}$ of the dots in the rows are fired on the printhead depending on the position of the printhead in the scan axis direction. This prior art methodology tends to obscure line feed errors, and reduce the visibility of missing or misdirected nozzles. In addition, prior art printers often use multiple levels of color on a single pixel (optionally putting more than one dot of a given color on a pixel to reach a saturated color). This gives less apparent noise in mid-tones, and further reduces the visibility of missing or misdirected nozzles. Use of additional inks with smaller dye loads gives the opportunity for less visible noise.

In general, it is known that throughput can be increased if less shingling and interlacing are done. For color images where the printhead resolution is greater than the eye's ability to detect the resolution, it is known in the prior art that by taking advantage of multiple drops on a resolution element to provide smoother looking color regions, and inkjet printers are trending to "multidrop" and "multiple dye loaded ink" solutions today. These multiple levels, in the present invention, no matter how implemented, provide the opportunity for better color matching using the algorithms discussed above as part of this invention.

One additional way known in the prior art to reduce color noise, which provides a multi drop effect, but with less granularity than simply high resolution, or lightly dye loaded multi drop—which may put too much water on the page is described in U.S. Pat. No. 6,354,694.

Use of all the above techniques known in the prior art are compatible with the present invention, and tend to further increase the efficacy of the algorithms of the present invention and reduce the visibility of the transition region which the present invention minimizes substantially.

Feathering with Multilevel Color

When printing, for example, 3-levels (0, 1, or 2 droplets or dots on a pixel), the prior art includes various options for establishing grey scale, typically called "halftoning".

In the binary case, typically in the prior art a pseudorandom decimal number between 0 and 1 (usually a computed, or possibly a precomputed 'mask' of random numbers corresponding to each position in the potential pixel array) is added to the desired density F (also a number between 0 and 1), and takes the integer part of the sum. If the result is 1, a dot is printed; otherwise, the dot is not printed. There are many variants of halftoning known in the prior art using different methods of generating the masks, such as those described in U.S. Pat. No. 6,543,871 assigned to EFI, U.S. Pat. No. 5,726,772 assigned to RCT and U.S. Pat. No. 6,057,933 assigned to Hewlett Packard. These halftoning algorithms give a random binary output whose mean value is the desired density, and whose variance (noise energy) is $$\sigma^2 = F \circ (a-F) \circ a \qquad \text{Equation 4}$$

where F is the desired grey value, and "a" is the level separation (1 in the case of binary printing). Thus the maximum $\sigma^2$ occurs in the mid-tones and is $0.5 \circ 0.501 = 0.25$, for binary printing.

In the prior art for the case of 3-level printing a grey level can be generated several ways, with different noise characteristics.

1. Given an F, one can choose 0, 1, or 2 droplets on a pixel. If the target F is 0.6, one should select either 1 or 2 pixels at random, however with the probability such that it is 4 times more likely to pick 1 dot than 2 dots, giving an average value of 0.6.
2. Alternatively, one can divide the target value (0.6) by 2 to get a value for each of 2 binary planes for each of the rasters. The planes would use the binary algorithm described above, each using independent random variables to perform the dither. The printer would print each of the 2 planes. The result would have an average value of 0.6, however a larger σ.

Algorithm 1 as stated above has a maximum $\sigma^2$ (noise energy) occurring at densities of $\frac{1}{4}^{th}$ and $\frac{3}{4}$ths, of $\frac{1}{32}$; Algorithm 2 as stated above has a maximum $\sigma^2$ (noise energy) occurring at densities of 0.5 of $\frac{1}{8}$. Algorithm 1 is generally preferred since it yields the lowest maximum noise. In addition, in the prior art, one can correct superpixel regions of pixels that have an average value different from the target value, and add corrections to some of the pixels by error diffusion to achieve lower noise for the superpixel areas. This would be the process if each color plane is considered separately. It is also possible to generate dithered color planes that are coordinated to reduce color noise. See for example U.S. Pat. No. 6,057,933, which is incorporated by reference.

It will be of interest later in the discussion of the present invention to consider a halftoning algorithm that has the same noise content independent of the level.

One such algorithm in the present invention is:
A. Chose the three nearest levels, A, B, C (not the nearest two levels, as is done above in the prior art) closest to a value V, the value to be halftoned;
B. Select one of the three levels in A using a random mask variable, subject to the constraints that:
a. $0 \leq P_A, P_B, P_C \geq 1$;
b. The sum of the probabilities of A, B, or C occurring is 1; i.e., $(P_A + P_B + P_C = 1)$;
c. The expected value of the resultant is the desired level; $(A \circ P_A + B \circ P_B + C \circ P_C = V)$;
d. The noise power is set to the maximum noise that would have occurred with the prior art halftoning $(P_A \circ (A-V)^2 + P_B \circ (B-V)^2 + P_C \circ (C-V)^2 = a^3/4)$
where $P_B$ is, for example, the probability of selecting level A;
and "a" is the level separation.

Whatever algorithm in the prior art would have been used to generate the color planes in the case of a single region and printhead assembly can be adapted to multiple heads/head assemblies and regions as follows.

The preferred algorithm for multilevel printing is similar to that of binary printing.
A. For each pixel in each color plane that would have been used in the single region printing process, determine the corresponding Alpha l(x,F) and Alpha r(x,F) values, in the transition region and B. multiple multiply Alpha l(x,F) times the corresponding color value of F (x) of the single region color plane, resulting in a target local density for the left raster D l(x,F);

C. multiply Alpha r(x,F) times the corresponding color value of F(x) of the single color pane, resulting in a target local density for the right raster D r(x,F);

D. Using separate (uncorrelated) bilevel pseudorandom masks for the right and left rasters, select among the two closest values for each pixel corresponding to D.

In the case of more than 3 levels printed of a given color, the algorithm is similar, however one would chose between the nearest 2 levels of the total number of levels.

A revised preferred algorithm for multilevel printing that maintains the average color value AND the noise characteristics across the transition region is as follows:

A. For each pixel in each color plane that would have been used in the single region printing process, determine the corresponding Alpha l(x,F) and Alpha r(x,F) values, in the transition region and B. multiply Alpha l (x,F) times the corresponding color value F (x) of the single region color plane, resulting in a target local density for the left raster D l (x,F);

C. multiply Alpha r (x,F) times the corresponding color value F (x) of the single region color plane, resulting in a target local density for the right raster D r (x,F);

D. Halftone both the left and right rasters with the tri-level halftoning process, each using uncorrelated random variables to select among the three nearest levels.

Experimental Methods of Determining Alpha

Though there is a theoretical method for calculating Alpha, in most cases, an empirical process is more reliable since it avoids making assumptions about the relationship between dot density and image density.

From the above analytical calculation of Alpha, it was observed that if Alpha l can be obtained as a function of Alpha r and F, Alpha r and Alpha l can be determined as a function of position. Since Alpha makes its biggest changes at high values of F, the most experimental data was generated in the region of high values of F. Refer here to FIG. 15 which is discussed as a part of the procedure of the present invention discussed below.

The procedure for producing Alpha reduces to:

A. Print patches 127 from the left raster in densities of approximately F=0.1, 0.6, 0.8, 0.95 using the stochastic halftoning method to be used later in printing the left and right regions. These patches will be a reference to which pairs of F∘Alpha l and F∘Alpha r are matched and chose Alpha l (F) and Alpha r (F) pairs which accurately reproduce F when printed with overlapping left and right rasters;

B. For each such patch, (which is the reference density) print an array of patches with normal density F and Alpha l 126 varying from about 0.05 to about 0.5, and Alpha r 128 varying from about 0.5 to 1.0 in steps of 0.05, and using different, uncorrelated masks for the stochastic halftoning pattern for the right and left printheads. The entries to be put in the table below are color patches that simulate regions of the transition zone.

C. For each reference density, pick the series of Alpha l and Alpha r pairs that correspond, i.e., for each of the colors F above, obtain pairs.

| Reference Density | Alpha l | Alpha r |
|---|---|---|
| 0.1 | .05 | Corresponding value |
|  | 0.1 | Corresponding value |
|  | 0.25 | Corresponding value |
|  | 0.5 | Corresponding value |
| 0.6 | .05 | Corresponding value |
|  | 0.1 | Corresponding value |
|  | 0.25 | Corresponding value |
|  | 0.5 | Corresponding value |
| 0.8. | 0.05 | Corresponding value |
|  | 0.1 | Corresponding value |
|  | 0.25 | Corresponding value |
|  | 0.5 | Corresponding value |
| 0.95 | 0.05 | Corresponding value |
|  | 9.1 | Corresponding value |
|  | 0.25 | Corresponding value |
|  | 0.5 | Corresponding value |

D. Build an interpolated function of Alpha r (F) vs. Alpha l (F). An interpolation function simply interpolates between the data points, and is part of standard mathematical calculation packages such as Mathematica.

E. Compute Alpha l=Alpha l(x, F) and Alpha r=Alpha r(x,F) as described above.

The table above is an example of generating a correspondence between Alphal(F) and Alphar(F). Where more accuracy is required, a greater number of data points need to be taken.

The above is thus a prescription of the present invention for reproducing uniform color across a transition region, using either experimental or analytical approaches.

Multicolor Transitions

To complete the process of multicolor printing, the procedure of measuring test patches illustrated in FIG. 15 and described in detail above should be done for each of the colors used in the printer (typically CYMK, and sometimes CC'YMM'K or even CYMKOG or other variants). The transition regions for each color can, and ideally should, be disjointed. Ideally, they would be adjacent to each other, at approximately the same spacing as the color to color spacing on the printheads so that the printheads do not have to travel any extra distance to implement the algorithms above, although this is not an absolute requirement.

Figure 16:
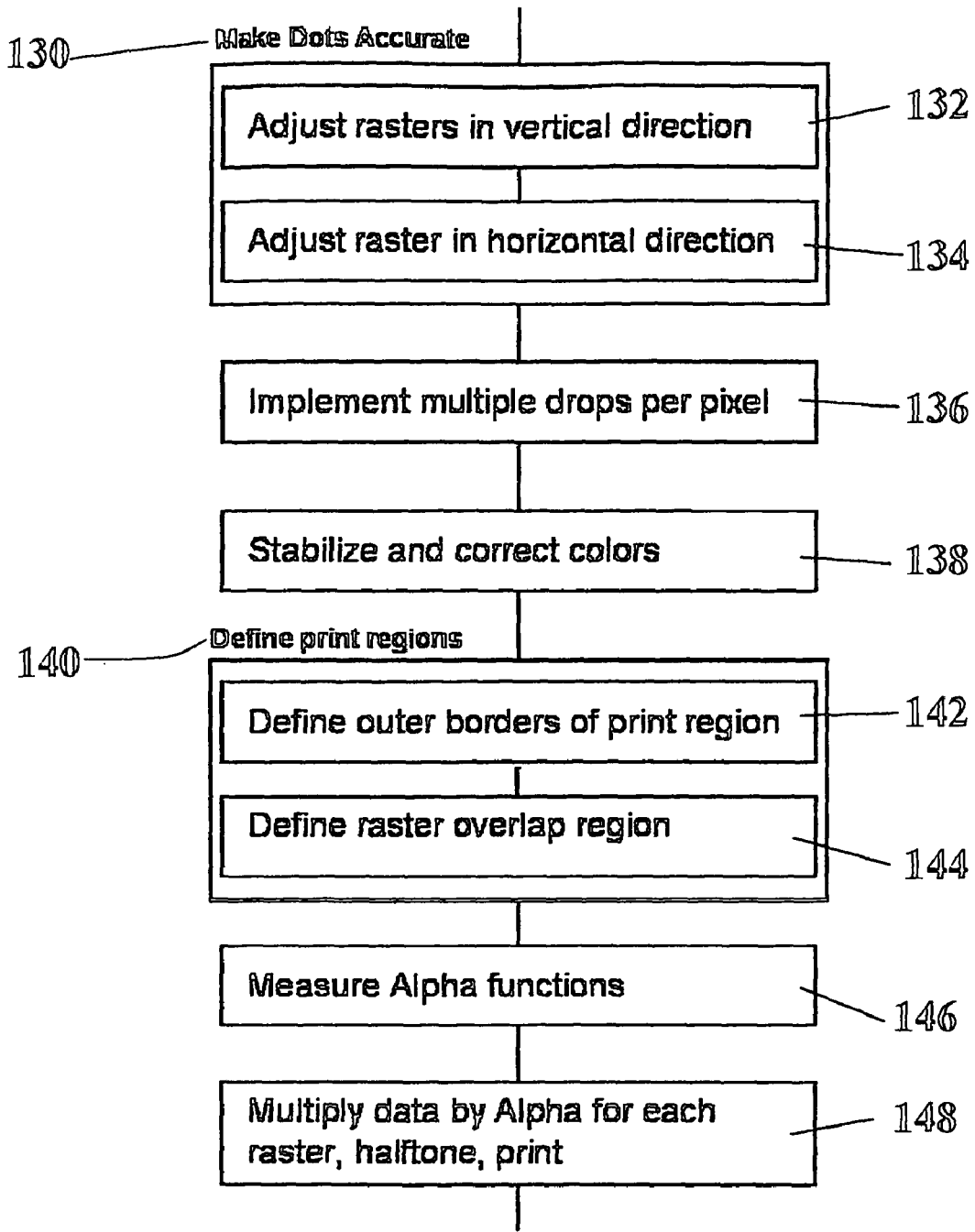
FIG. 16 is a flow chart illustrating the method steps of the present invention for butting printed regions on the substrate without leaving visible artifacts.

Flow Chart of the Present Invention for Design and Operation of Multi-Printhead Printers Reference here is made to FIG. 16 that is discussed in detail in this section.

Figure 14:
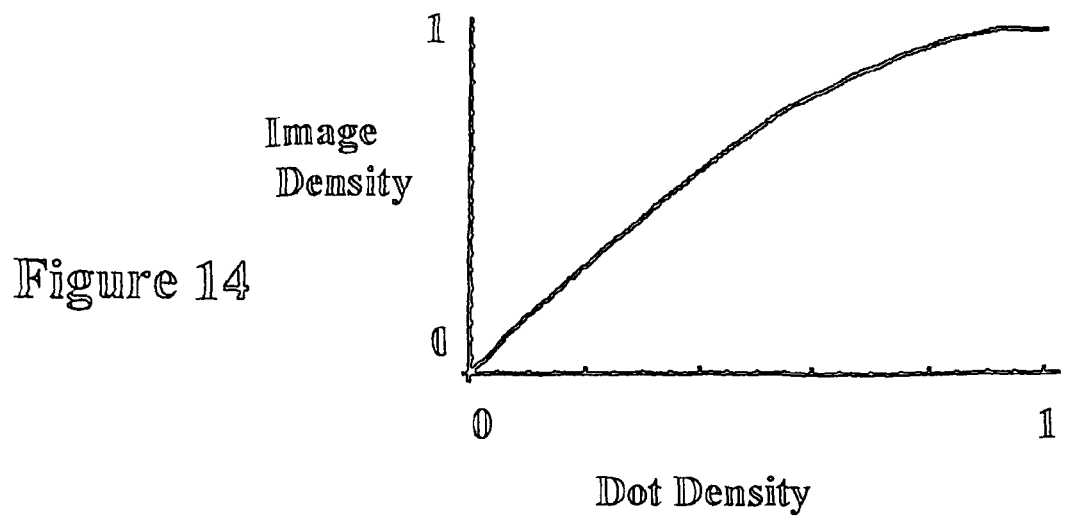
FIG. 14 is a typical curve of optical density versus dot density showing saturation for black dots with a radius just sufficient to cover a page completely at 100% dot density.

To design a printer for quality that is consistent with cost the present invention offers the following process:

A. Make dot placement accurate (130), and repeatable (ideally within 1 or at least a few dot diameters):

a. First, identify corresponding nozzles on each printhead (which may not be the same number in all printheads, because of a paper axis offset due to manufacturing tolerances). Renumber the nozzles that print the same horizontal dot row to have the same number, and don't use nozzles that have no counterparts on all the other printheads. This would typically be done by printing a test pattern with the cartridges and measuring the nozzle offsets in the paper axis with an onboard optical sensor, or printing a test pattern sensitive to nozzle misalignments, and having the user select which pattern is least misaligned (132);

b. Second, identify any scan axis offsets between the nominal location of a printhead, and the actual location, and enter that offset in the print tables such that no dot will be printed offset more than about 1 pixel spacing either in the scan axis, or the paper axis. This may be done through the use of optical sensors observing offsets of alignment test patterns, or by having the user select which pattern is nearest optimum, and entering that data into a table via one of many possible means (134);

B. Implement the appropriate number of dots per pixel (136):
   a. This should ideally be at least 2 dots of each color, and possibly more than 1 dye load color;

C. Stabilize, and if necessary correct the colors from each inkjet pen:
   a. Use cartridges or printheads whose colors are matched, and stable, and perceived to give identical colors. If not matched off the production line, individually calibrate each head to match, and/or build in printer controlled mechanisms to adjust colors appropriately. This could include occasionally calibrating the head, and adjusting some head parameter such as temperature or bias voltages (138);

D. Define a number of print regions corresponding to the number of printhead arrays (140):
   a. Make the print regions of same width, and (optionally) make the borders of the regions pass through easy transition regions (142);
   b. Use a transition region width at least 5 times, and preferably 40 times wider than the greatest anticipated residual corresponding raster offsets after calibrations (144);

E. Measure the Alphas as described above for each color and for each relevant print mode (draft, best, photo, etc.), and print medium (plain paper, photopaper, etc.) (146);
   a. Use a the test pattern described above and shown in FIG. 14 to measure Alpha l and Alpha r pairs for a series of colors, and using the methodology illustrated, and discussed in relation to, FIGS. 11A-E determine Alpha l (x, F), and Alpha r (x, F). Use non-correlated pseudo random variables for the masks for the right and left rasters when generating the test patterns;

F. When the printer is an actual operation, print Alpha l ∘ F on the left raster, and Alpha r ∘ F on the right raster for each color plane, using uncorrelated mask random variables for the left and right rasters to generate the actual pattern of drops fired for all colors (148).

Depending on the cost objective of the printer, some of these steps can be left out or modified, with a certain amount of penalty in terms of visible overlap artifacts. For example, in low cost printers, measuring and correcting the color value in the left and right regions may be done manually (by the end user of the printer by comparing printed colors of a left patch to alternative colors of a right patch, and entering the best match via the computer to a table, which can then be used to develop the corrections similar to what is currently done in some prior art printers to align the printheads). In higher cost printers, a scanning spectrophotometer or densitometer in the printer could be used to measure and feedback the same data to the printer controller or internal processor. In the lowest cost printer, no color calibration would be done by the user, and default color tables would be implemented in the printer. Those calibrations could be standard for all produced printers, or calibrated just once on a production line for a specific printer's mechanical tolerances.

Similarly, the methods for measuring and correcting for nozzle offsets can be manual, automatic, or not at all, depending on the cost/quality trade-offs appropriate for the printer target application.

Printing algorithms of the present invention always use the dot replacement algorithms discussed above, and could use default Alpha functions, or Alphas that were manually or automatically read periodically, or when an event occurs (e.g., the paper is changed).

Third Preferred Embodiment-Black Only Printers with Further Speed Improvements

Figure 17:
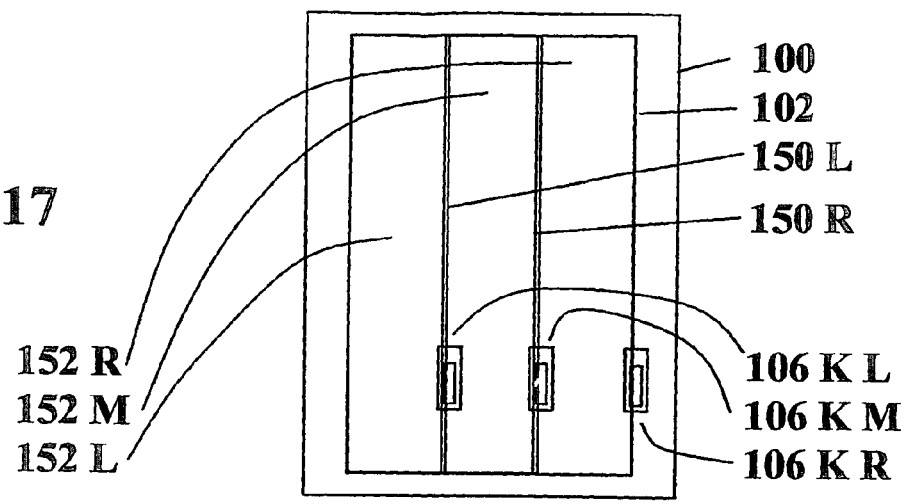
FIG. 17 shows a third preferred embodiment of the present invention in a simplified top view of a black only printer, with 3 black printheads scanning 3 separate corresponding regions or columns of the substrate.
Figure 18:
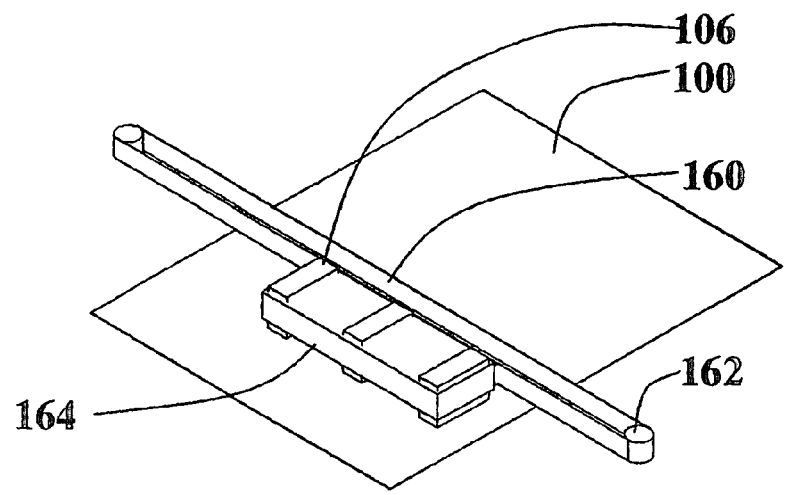
FIG. 18 shows a simplified perspective view of a first alternative of the third embodiment of the present invention, with the printheads mounted rigidly together.

The third embodiment of the present invention results in a black only printer with a speed above 30 pages per minute using 1 inch swath printheads (the current state of the art printhead swath width). In brief, 3 black printheads are mounted on a ganged array, as shown in FIGS. 17 and 18. More specifically, FIG. 17 shows a simplified top view of a black only printer, with 3 black printheads (106KL, 106KM and 106KR) scanning 3 separate corresponding regions or columns (152L, 152M and 152R) and transition regions 150L and 150R of printable region 102 of substrate 100 with the printheads aligned one with the other to each cover approximately one third of a swath across the printable region 102 substantially perpendicular to the columns.

FIG. 18 shows a simplified perspective view of a first alternative of the third embodiment of FIG. 17 with the printheads mounted in a rigid relationship with respect to each other. The printheads are mounted in carriage 164 in a fixed relationship to each other with carriage 164 affixed to belt 160 with belt 160 driven by sprocket 162 that is under the control of the printer controller. For simplicity, other well known details of the inkjet printer are not shown.

With the printheads in the configuration shown in FIGS. 17 and 18, if the print speed for a printer with a single black printhead is 21 pages per minute, the corresponding print speed for a printer that incorporates the 3 printhead configuration of the present invention will be nearly 41 pages per minute at 2 g acceleration of the printheads. The only practical limit to the number of black printheads aligned to each other as shown, other than the physical width of each printhead, is the acceleration and deceleration time, which should be kept well under the printing time. For typical prior art office printers, horizontal scan speeds are conveniently 30 inches per second. If the swath time is set equal to the sum of the deceleration time and the acceleration time, $T_{swath} = T_{deceleration} + T_{acceleration}$, the minimum printable region 102 width for 2 g acceleration when calculated is about 1.88 inches, and about 1.2 inches for 3 g's which should be practical for a black only printer. A printer with 5 black heads in a configuration similar to that of FIGS. 17 and 18 and 3 g acceleration would have print speed of about 64 pages per minute.

Figure 19:
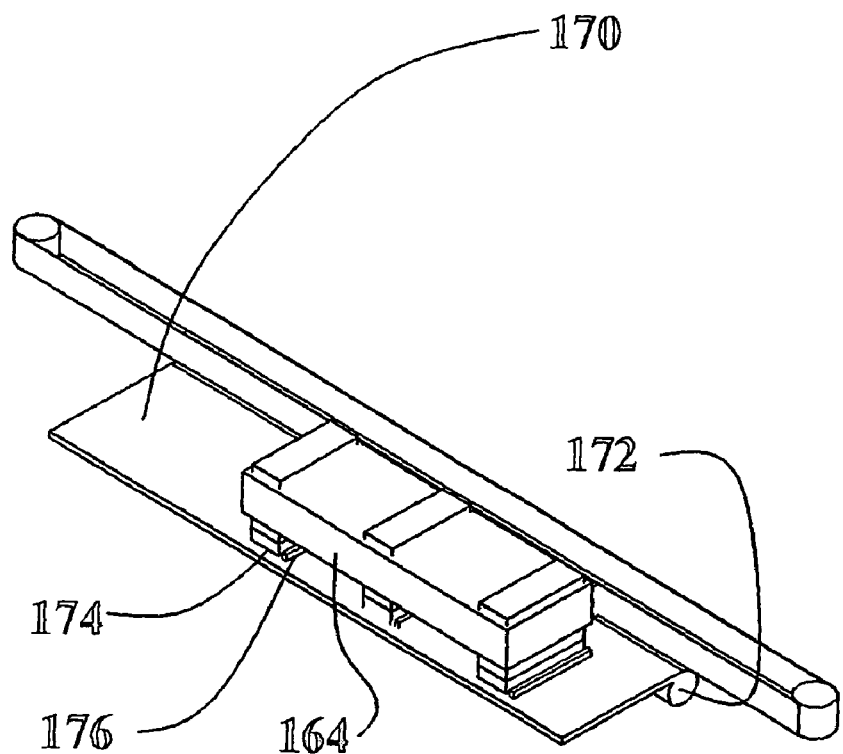
FIG. 19 shows a perspective view of the first alternative of the third preferred embodiment, with the addition of a service station under the paper path.

FIG. 19 shows a close-up perspective view of the configuration of FIGS. 17 and 18 with the addition of a printhead service station 170, including capping mechanisms 174 and wiping mechanism 176, in close proximity to carriage 164 under the paper path, so that the ganged printheads do not have to be moved over to the side of the printer (which is typically done in the prior art) which would result in a much wider printer than prior art printers. Thus, the printer would not have to be much wider than the paper being printed upon. Employing a service station 170 under the paper path is desirable in most cases where mechanically ganged printhead arrays are used. The service station 170 has a mechanism to move it downward and out of the way during printing and upward to cap the printheads when carriage 164 in the home position by means of shaft 172 that is driven by a mechanism (not shown) that is controlled by the main printer controller. The actual carriage 164 and service station 170 can be configured in a number of ways to accommodate different physical printer configurations that might be adopted by the manufacturer.

In printers employing the 3 printhead embodiment of the present invention is not limited to having the printheads rigidly coupled together, however rigid coupling would be the simplest implementation for this embodiment of the present invention.

Alternative methods to mount and move the printhead arrays include:

A. Rigidly attaching the arrays together with a linkage, or common carriage 164 as in FIG. 19, thus saving additional motors and additional motion feedback servo loops. In this situation, it is highly desirable to have the capping and wiping function performed by an apparatus under the paper path. Otherwise the printer would have to be as wide as the width of the paper plus the width of the printhead carriage. This method would result in the lowest cost implementation of most printers that incorporate this embodiment of the present invention.

a. Alternatively, the capping and wiping could be accomplished by rotating the printheads upward through at least 90° around the scan axis to a capping position above the paper path.

Figure 20:
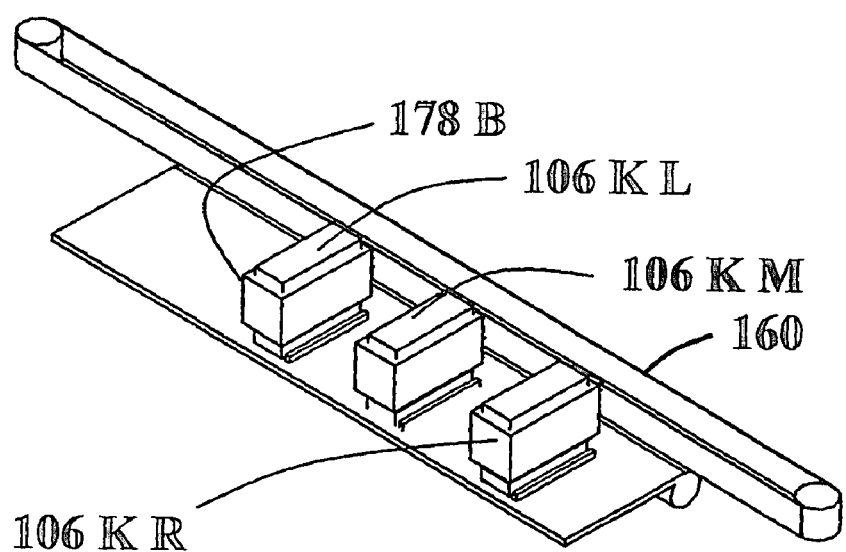
FIG. 20 shows a simplified perspective view of a second alternative of the third embodiment of the present invention with the printheads mounted individually and connected to either the front or the back of the drive belt (shown here connected to the front of the belt)

B. FIG. 20 shows a simplified perspective view of a second alternative of the third embodiment of the present invention with the printheads (106KL, 106KM and 106KR) mounted individually and connected to either the front or the back of the drive belt 160 (shown here connected to the front of belt 160). Attaching multiple printheads or printhead arrays 178B to common drive belt 160 would use one motor and would probably require a position feedback servo loop (not shown) for each array. The arrays could move in parallel motion, or (using the other side of the belt for some of the individual printhead arrays 178B) contrary motion. In the belt drive implementation, it would be very desirable to have the capping and wiping function performed by an apparatus under the paper path. Otherwise the printer would have to be as wide as the width of the paper plus the separation of the two outer most distant printheads.

a. This method would have a slightly higher cost, however it might result in less moving mass and vibration than in case A. immediately above.

C. FIG. 21 shows a simplified perspective view of a third alternative of the third embodiment printer of the present invention, with the printheads (106K1, 106K2 and 106K3) mounted individually on, and controlled individually by, separate drive belts (182A, 182B and 182C), plus a novel paper drive mechanism 180. Each of drive belts (182A, 182B and 182C) are driven by separate motors coupled to separate position feedback servo loops (not shown). While in this case it is less advantageous to have a capping and wiping function under the paper path, since the printheads can be positioned adjacent to each other and thus would not require as much space at the side of the printer as when the printheads remain in a fixed relationship with respect to each other as in FIG. 19, it is still desirable. If capping and wiping are not under the paper path, the printer would have to be at least the width of the paper 100 plus the width of the all 3 printhead arrays (not shown). FIG. 21 also shows a pair of ribbed drive rollers 180A and 180B with the drive wheels 181 on each of the drive rollers offset from each other with drive roller 180A above paper 100 and drive roller 180B below paper 100 which when driven by a drive system controlled by the printer controller induce a corrugation pattern in paper 100 with each of the rollers above paper 100 creating a downward indentation while the rollers below paper 100 are creating an upward indentation. One such means includes inducing a low amplitude (approximately 5 to 10 mil) ripple in the paper using offset ribbed rollers 180 (with the wave crests like a corrugated roof coming out of the printer). This induces a high bending moment while the paper is under the printheads. The corrugation gives paper 100 a three-dimensional shape to stiffen paper 100 in the region under the printheads; this is particularly important in two-sided printing.

To get the desired speed improvements over the prior art printers, the printheads need only print on substantially disjoint regions of the paper (e.g., as in the defined regions shown in FIG. 17); how the heads are actually positioned is a secondary factor that affects issues such as cost, printer size, and vibration.

Figure 26:
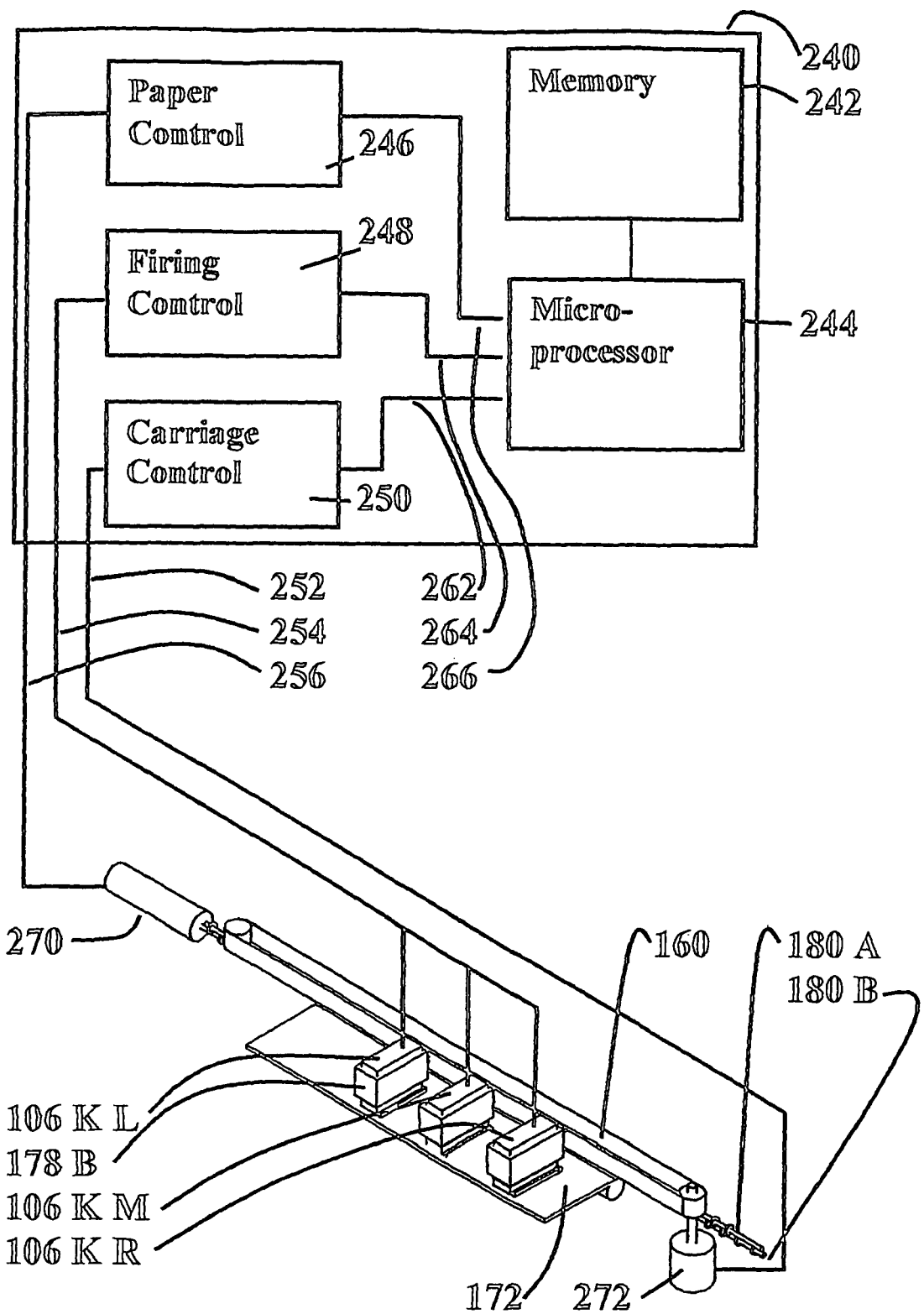
FIG. 26 shows a simplified block diagram and drawing of a printer electronics and paper path.

FIG. 26 is a simplified printer implementation that includes a combined block diagram of a print process and control subsystem together with the primary mechanical printer elements (similar to those shown in FIG. 20) of a paper path. Process and control subsystem 240 includes microprocessor 244 that coordinates the operation of the various functions of the printer. In communication with microprocessor 244 is memory 242 that contains various print algorithms, data and data look-up tables to perform the conventional and present invention functions of the printer. Alternately, or in combination with, the information stored in memory 242, there may be additional print algorithms stored in the host computer (not shown) which are used to process the data to be printed from various programs that are being used on the host computer with that raw and/or processed data being transferred to microprocessor 244. Then the data is further processed by microprocessor 244 and transferred to paper control 246, firing control 248 and carriage control 250 via busses 262, 264, and 266, respectively, in the needed sequence as determined by the printer operational algorithm(s). In the embodiment shown here, paper control 246, via buss 256, activates motor 270 which in turn is coupled to the paper drive mechanism that is shown here consisting of drive rollers 180A and 180B between which the paper (not shown) passes and is advanced and retracted thereby as determined by the print algorithm then in use. Firing control 248, via buss 254, is coupled to each of printhead arrays 106KL, 106 KM and 106KR, to cause each printhead to individually expel drops of ink at precise points in time onto the paper as determined by the same print algorithm that determines the positioning of the paper by paper control 246. Similarly, carriage control 250, via buss 252, is coupled to motor 272 that drives belt 160 to laterally position the printheads laterally at the right point in time with each of the printheads, or a carriage 178B on which they are each mounted, being attached to belt 160. Thus it can be seen that with microprocessor 244 coordinating the operation of each of paper, firing and carriage controls, the paper and printhead carriage are positioned at the correct location in time that the printheads are fired to deliver drops of ink to the correct location on the paper.

Fourth Preferred Embodiment-Wide Format Printing

Multiple printhead arrays (i.e., 2 or more arrays) would be especially useful in wide format printing, where it is uneconomical and unfeasible to make much larger swath printheads, and definitely unfeasible to make page width printhead arrays. In the large format case, many more than 2 printhead arrays would be useful. To make an effective multiple head printer that is not extraordinarily wide, and have a simple control mechanism, the printer would be a cut sheet printer (where the printhead assemblies could be serviced after each sheet), and have the service station under the paper path.

An alternative implementation of the service station could be above the paper path, with the printheads rotated to mate with the service station.

Alternatively, such a wide format printer could use option C of the third preferred embodiment above with separate servo motors and position sensors.

Other Considerations for the Third And Fourth Embodiments

It is not necessary that the printhead arrays all move in unison, although that might, in most cases, be the simplest design. For example, other designs are possible where the heads are coordinated in "contrary motion" that could result in less printer vibration. Alternatively, printheads that move in a fashion that is almost 180 degrees out of phase, but not quite, from each other would allow much less vibration, and the adjacent printheads would not run into each other. For example, a printer with a three printhead assembly as described in the third preferred embodiment could have the printheads moving with 120 degree phase differences as one proceeds from right to left. This would result in virtually no vibration.

Conceivably, each printhead array, and even each printhead alone, could have its own motion control subsystem, coordinated in a fashion to optimize print speed and quality, while at a minimum system cost. Separate motion control systems would also provide better flexibility for dealing with different width substrates to maximize throughput than in systems where printhead spacing is fixed.

The benefits of the above implementations are much higher speed at little additional cost, and the ability to use existing printhead designs to make much faster printers.

Fifth Preferred Embodiment-Double Sided Printing

Most printers are inherently incapable of printing simultaneously on both sides of the sheet at the same time. Laser printers have a drum to provide a pattern of toner that is applied to one side of the paper by a roller pressing the paper onto the drum from the opposite side of the paper. Offset presses apply inked material on one side of a piece of paper while applying pressure via a platen on the other side of the paper. Thus, double sided printing has, to date, required sequential printing first on one side, then on the other, resulting in large, expensive machines. Alternatively, for inkjet printers that can only print on one side of a sheet at a time to be capable of printing on both sides of the same sheet have to be able to, in effect, turn the sheet over, long side for long side for printing on the second side after printing of the first side has been accomplished and the ink has dried sufficiently before passing the sheet through the printer a second time. The "turning of the sheet over" to print the second side could be accomplished by first drawing the sheet back into the printer and as doing so using a "reverser" which directs the narrow end of the sheet that was the bottom of the page on the first pass through 180° and feed it into the print mechanism first for printing on the second side. However, the end that is now being feed back into the print mechanism was the bottom edge of the sheet when printed on the first side and is now the top edge of the sheet thus if printing proceeds as if the orientation of the sheet had not changed, the printing of the second side of the sheet will be upside down from that on the first printed side unless an additional function is performed before the second side is printed. To have the top of each printed side be adjacent the same edge of the sheet, what can be done is it to electronically invert the printing order for the second side so that printing proceeds by printing the text or image upside down relative to the image on the first side, i.e., from the bottom of the image to the top of the image. Stated in another way, when the first side of the sheet is printed, the top of the image first exits the print mechanism, while when the second side of the "reversed" sheet is printed, the bottom of the image on the first side of the sheet exits the print mechanism first.

Both of the prior art methods for printing on both sides are inherently more expensive, more complicated, and in the case that uses a "reverser", limit throughput because the reverser has to wait for the first side of a sheet to be completely printed and dried, before reversing the paper, thus forcing the print mechanism to idle while the paper is reversed.

Another benefit of the present invention is that a sheet of paper can be printed with scanning inkjet printheads simultaneously on both sides of the sheet with dedicated printhead arrays. Further, multiple printhead arrays can be utilized on both sides of the sheet to further increase throughput. This can be done on cut sheet as well as web based printing formats.

Figure 22:
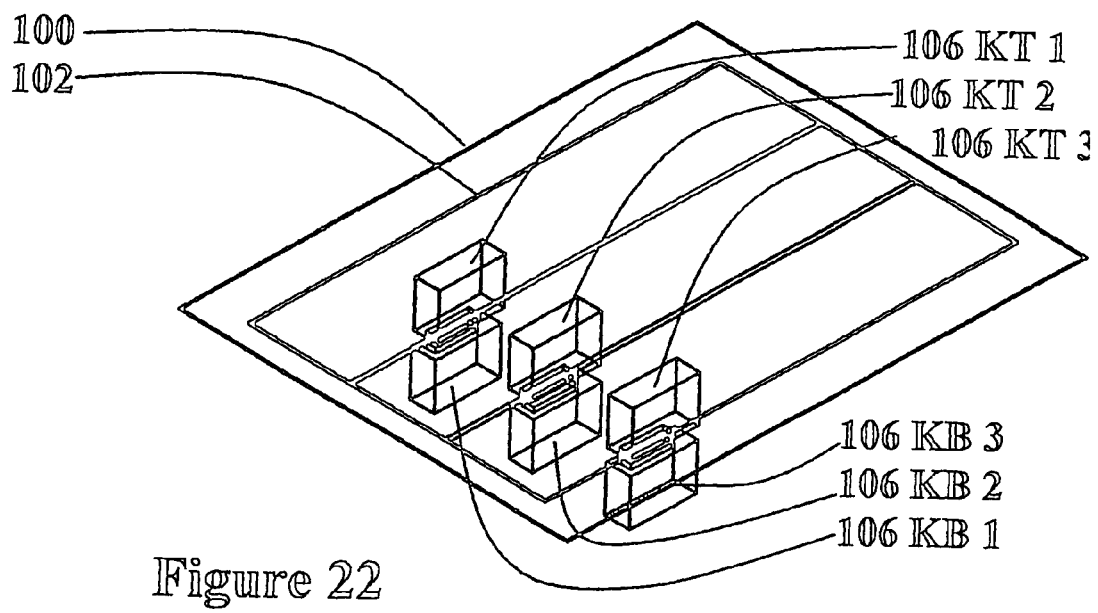
FIG. 22 shows a simplified perspective view of a fifth preferred embodiment of the present invention to permit black printing in corresponding regions; on both sides of the paper.

FIG. 22 shows a simplified perspective view of a fifth preferred embodiment of the present invention to permit black printing in corresponding regions on both sides of the paper. FIG. 22 shows two sets of ganged black printheads (in this view 106KT1, 106KT2 and 106KT3 are above page 100; and 106 KB1, 106 KB2 and 106 KB3 are below page 100), one on each side of paper 100. This is an extension of the third embodiment shown in FIG. 17. With that black printhead array configuration of 3 printheads adjacent each side of page 100, the printer could achieve a full page print rate of 41 double sided sheets or 82 pages per minute, at a relatively inexpensive printer manufacturing cost compared to prior art technologies; with black arrays of 5 printheads, one could achieve 64 double sided sheets or 128 pages per minute.

Figure 23:
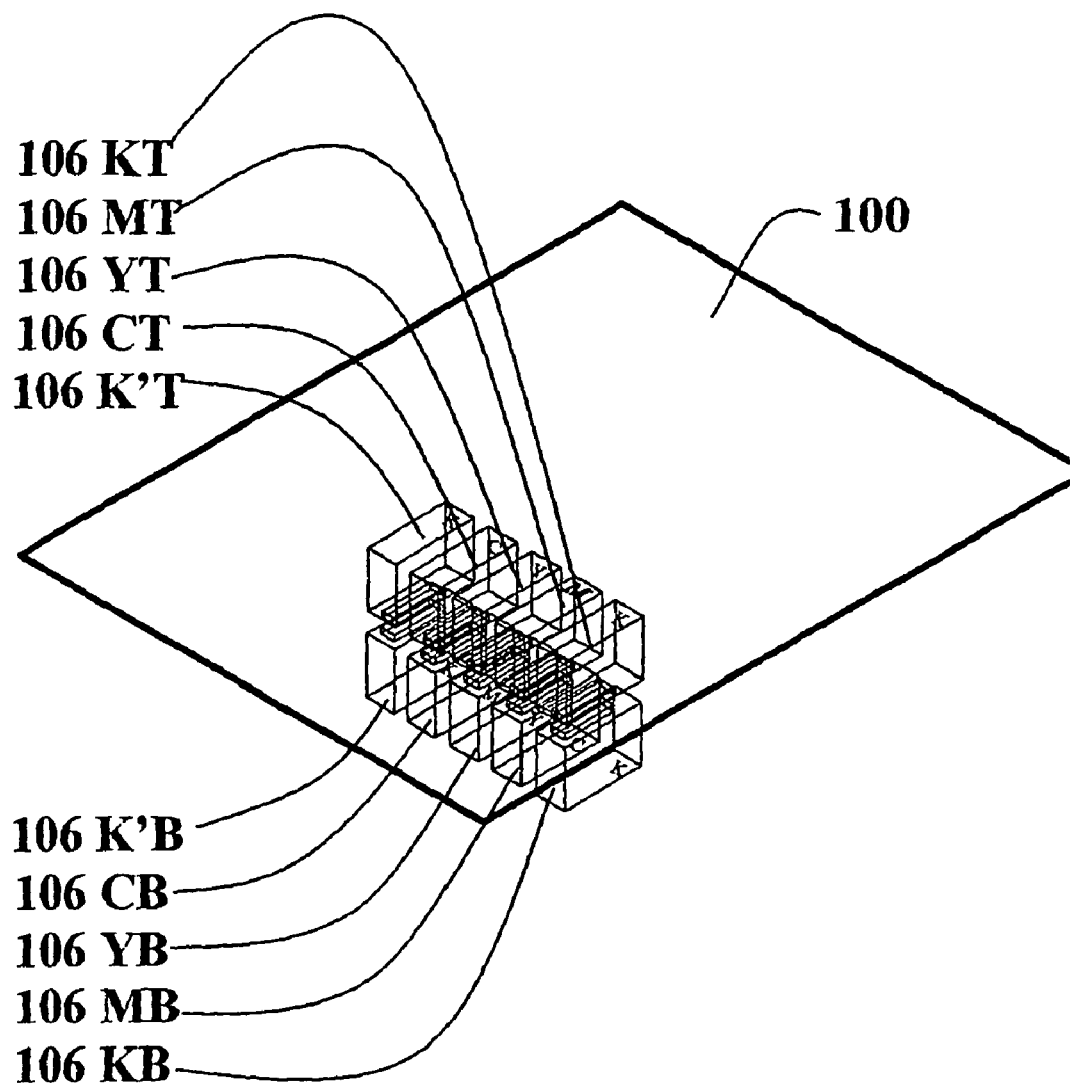
FIG. 23 shows a simplified perspective view of the fifth preferred embodiment of the present invention to permit color printing on both sides of the paper with double the black print speed over the first preferred embodiment, shown in FIGS. 4A and 4B.

Turning now to FIG. 23 there is shown a simplified perspective view of a fifth preferred embodiment of the present invention configured to permit black and color printing on both sides of the sheet 100 with double the black print speed over the first preferred embodiment, shown in FIGS. 4A and 4B.

FIG. 23 shows a single scanning color printhead array on each side of sheet 100, with black printheads on each end of the array (106KT, 106MT, 106YT, 106CT and 106K'T above sheet 100; and 106K'B, 106CB, 106YB, 106MB and 106KB below sheet 100. With such an arrangement, it would be possible to obtain a black only, double sided print rate of 35 double sided sheets, or 70 pages per minute (ppm). Color print speed for the configuration of FIG. 23 depends primarily the interlace factor and the overtravel of the printhead arrays, yet this configuration could still be 4-15 times faster than existing prior art inkjet modes of double sided color printing.

Printing with multiple color printhead arrays on both sides of sheet 100, similar to the black only embodiments of the present invention as shown in FIG. 22, for example, is also a variation of the present invention. Such a configuration, with 3 color printhead arrays on each side of sheet 100, each with 1 inch swath and 1 inch overtravel plus an interleave factor of 2, the print speed achievable is about 11 double sided full color sheets or 22 pages per minute.

In the case of double sided printing one cannot support the paper from below in the print zone, as is done in the prior art. Therefore, it may be useful to provide stiffening means (e.g. rollers 180A and 180B as in FIG. 21) to keep the paper exactly half way between the printheads, and thereby preventing the printheads from hitting the paper and smearing the ink. One such means includes inducing a low amplitude (approximately 5 to 10 mil) ripple in the paper using offset ribbed rollers 180 (with the wave crests like a corrugated roof coming out of the printer). This induces a high bending moment while the paper is under the printheads. Alternatively, the printer may support the paper at the exit of the print zone on an air pillow impinging on both the top and the bottom sides of sheet 100, and to prevent cockle in the print zone by ensuring that wet paper stays in the print zone less than 5 seconds—which is easily possible with the higher speed implementations made possible by using multiple printheads configurations of the present invention.

Sixth Preferred Embodiment-Segmented Page Width Arrays

Figure 24A:
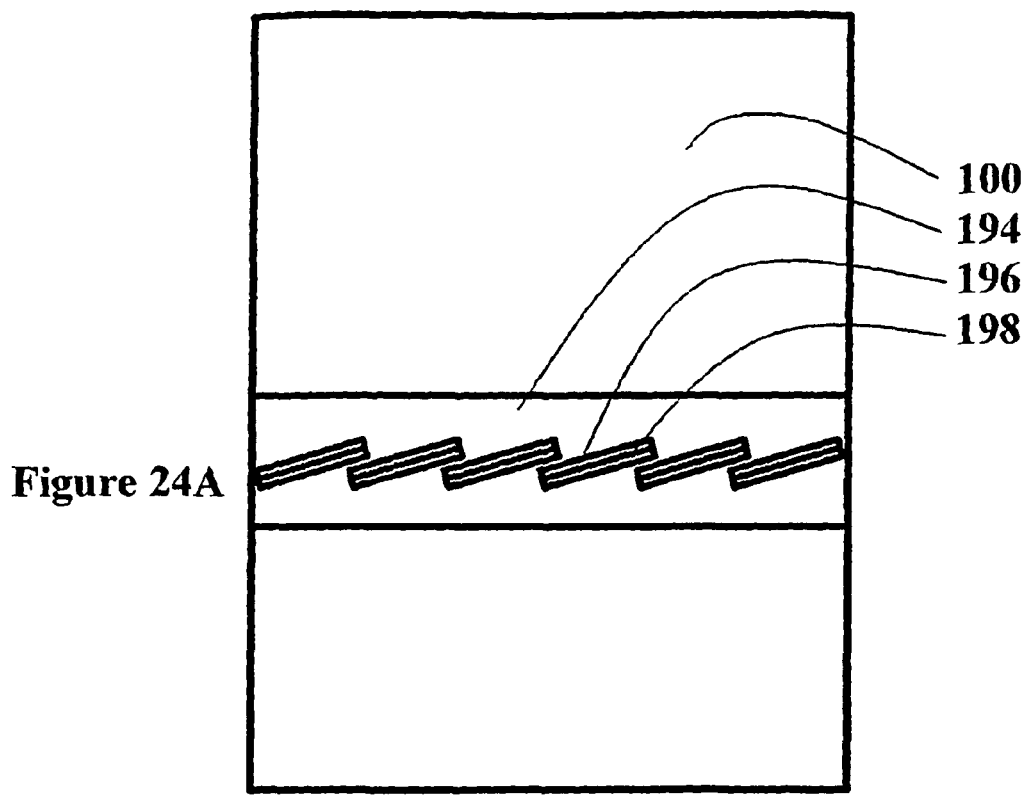
FIG. 24A shows a simplified top view of a sixth preferred embodiment of the invention, with segmented pagewidth printheads.
Figure 24B:
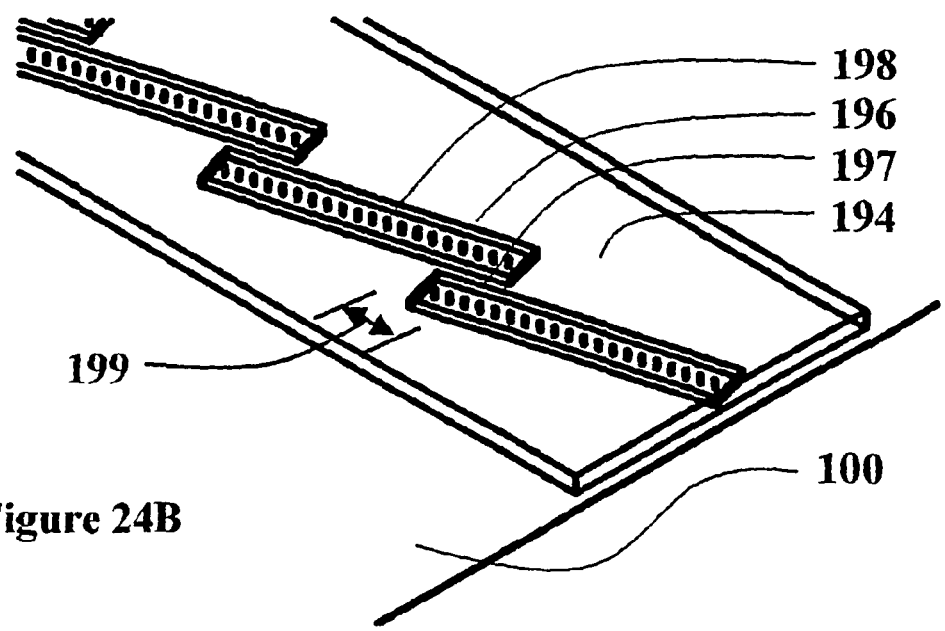
FIG. 24B shows a perspective magnified view of the right end of the segmented pagewidth printhead shown in FIG. 24A.

Ideally, page width arrays printing one or more colors could be constructed as a single monolithic structure with all nozzles evenly spaced apart across the page. However, generally this is not economically feasible because of low fabrication yields, or the inability to source substrates of the required size and properties. Hence, many prior art pagewidth arrays are constructed of printhead segments arranged in a fixture in a regular pattern to approximate a monolithic design as shown in FIGS. 24A and 24B. In these figures, which are wire frame depictions to make visible the relationships of the various elements, the array substrate 194 supports print segments 196 (on the bottom side of the support, and between the paper and the support) that are rotated at an angle to ensure that the dots from individual nozzles 198 overlap. However, alignment of the segments is not perfect, and therefore nozzle spacing irregularity occurs at the adjoining regions 197, which can result in vertical lines or gaps in the printed image on the page. Errors as small as $\frac{1}{10}$ of a pixel dimension could be visible —which at 600 dpi, is about 0.16 mils, or about 4 microns.

Thus, in the present invention printing segments 196 are overlapped (199) slightly, as shown in FIGS. 24A and 24B, and the present invention uses the same algorithm for this application as discussed above for computing the dot densities to be printed by the rasters (in this case, each part of the print line printed by the left and right segment). Specifically, the overlapping region 199 is analogous to the transition zone 116 of FIGS. 4A and 4B. Each line printed with each adjacent printhead segment 196 is printed with a halftone derived from uncorrelated masks, and the densities F in the "transition region" (overlapping region) are multiplied by Alpha l for the left printhead segment and Alpha r for the right print head segment, and printed with the halftone mask for that printhead segment. Thus, for example, if segments 196 are 1 inch wide at 600 dpi with potentially 1 dot placement error, segments 196 would be over lapped by 0.067 inches on each end.

Seventh Preferred Embodiment-Line Feed Errors

The difficulty of accurately advancing paper in a printer is a well recognized problem in the industry. Line feed errors are visible as light or dark horizontal bands on the paper that are particularly visible in uniform color regions. Due to the recognition of this problem, most printers incorporate interlace printing, and advance the sheet only a fraction of the swath width (usually a third or a fourth a swath width) when printing in color, as shown in prior art FIG. 25A. This interlacing and corresponding fractional swath advance has two effects: smaller advance errors are produced since the paper is moving a smaller distance (the result of fractional swath advance), therefore the width of each white band is smaller, and the color intensity of each band that is smaller by $\frac{1}{3}$ or $\frac{1}{4}$ of the average intensity because each region where a band might appear is also printed in other passes in the middle of the printhead (the result of shingling). While this technique is fairly effective, it comes at a cost of 3 to 4 times the number of passes across the paper than would otherwise have been necessary had there been no paper advancement error, thus slowing the printing a like amount.

Figure 25A:
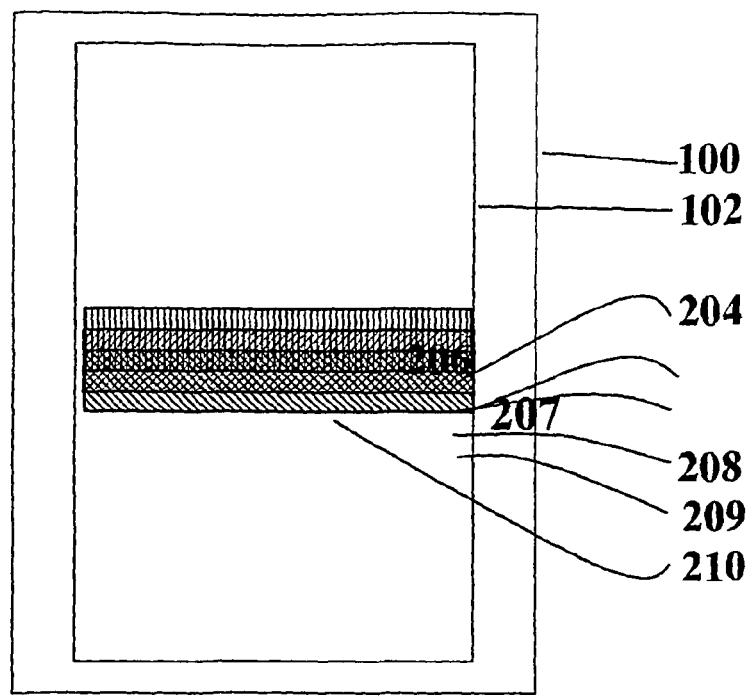
FIG. 25A shows the prior art interlacing technique to hide line feed errors.

Prior art FIG. 25A shows as an example of that printing technique with the printed area from a 1 inch swath printhead employing 3 way interleave, and therefore advancing only 0.33 inches per swath. The vertical cross hatched region (strips 204, 206 and 207) represents the area printed in the first swath (though only $\frac{1}{3}^{rd}$ of the print nozzles are fired at any one time); the right leaning cross hatched region (strips 206, 207 and 208) represents the area printed by the second swath; and the left leaning cross hatched region (strips 207, 208 and 209) represents the area printed in the third swath. At the end of 3 scans, only $\frac{1}{3}^{rd}$ of an inch has been fully printed, namely region 210 (strip 207).

Figure 25B:
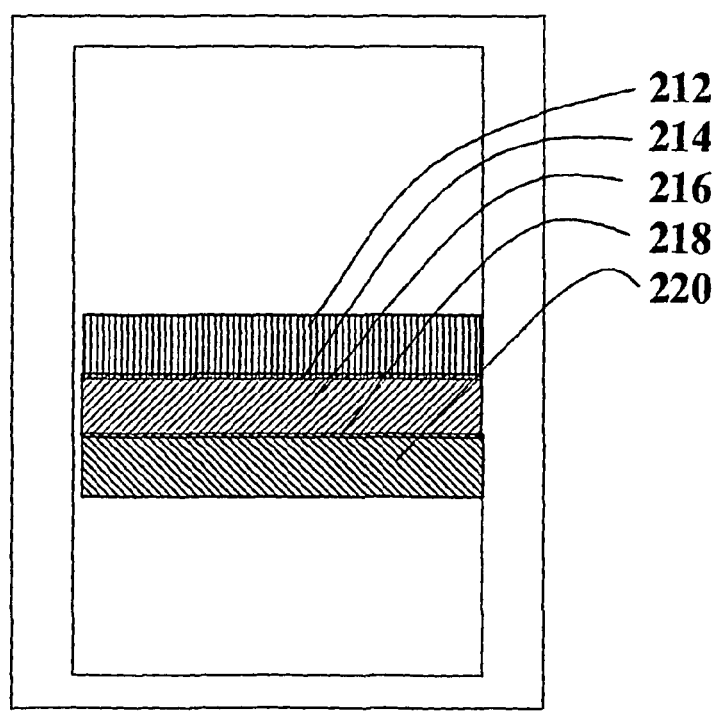
FIG. 25B shows the sixth preferred embodiment of the invention where the feathering method of the present invention is used to hide line feed errors.

The present invention provides a solution to the print slow down penalty of the prior art discussed above with respect to FIG. 25A. The present invention approach is illustrated with the aid of FIG. 25B, with penalty being avoided by using the feathering scheme of the present invention. Specifically, the overlap regions 214 and 218 (similar to vertical transition region 116 of FIG. 4A) are feathered by: printing each swath using uncorrelated mask halftones, and in the overlap regions 214, multiplying the desired density F by Alpha t (for the top band 212) and Alpha b (for the bottom band 220). Alpha t is the same function of y as Alpha l was of x; Alpha b is the same function of y as Alpha r is of x). The width of the transition/overlap region would be 40 times the maximum anticipated line feed error. In FIG. 25B, the first swath 212 (vertically cross hatched) is completed; and the second swath 216 (right leaning diagonal cross hatched) overlaps the first swath in overlap region 214. Thus, for a 1 inch, high swath, the overlap would typically be 0.067 inches—or 6% of the swath height. Thus, in effect, the print speed would be increased almost by the interlace factor—reducing the interlace factor in this embodiment to nearly 1. Similarly, the third swath 220 (left leaning diagonal cross hatched) overlaps the second swath in overlap region 218.

Eight Preferred Embodiment-Color Bidirectional Printing

Color printing in the prior art is usually done only unidirectionally because:

A. The ink droplets that are offset in one direction when scanning to the right are offset in the opposite direction a varying amount when scanning to the left. This results in a pattern of shifting colors when overlaying rasters are shifted slightly, known as moiré patterns in the prior art.

B. When one ink color X is deposited on top of a previously deposited color Y, the resultant printed color is different than if color Y is deposited on previously deposited color X.

Bi-directional scans in the present invention can avoid these prior art effects by:

A. Using independent, uncorrelated masks for each of the colors, in each direction. Therefore, when an offset because of mechanical imperfections occurs, some of the drops of different colors that now overlap more than in a mechanically perfect printer are compensated for by drops that are overlapped less, due to the effect of the use of uncorrelated masks—thus making the perceived color unaffected by mechanical offsets or drops of ink.

B. The intrinsic difference in color that occurs when inks are deposited in different orders can now be measured and reversed in the printer color tables, which would now be different for each direction of printing.

Thus, by using independent masks for each color in each direction of printing, and by developing different color tables for each direction of printing, bidirectional color printing is enabled, speeding up color printing by another factor of about 2.

Combinations of Embodiments

While the various embodiments have been discussed separately, a combination of various of the embodiments of the present invention would be useful in the same printer.

It is generally possible to combine the various embodiment methods of the present invention discussed above. For example, it is possible to, for color printing:

A. Use multiple printheads, scanning corresponding regions on one side of the paper for a 3× improvement (second and third embodiments);
B. Use on both sides (2× improvement) (fifth embodiment);
C. Reduce interlacing by a factor of 3 to 8 (3 to 8 times speed up) (seventh embodiment);
D. Implement bidirectional printing (up to 2× improvement) (eighth embodiment);
E. In doing simultaneous printing on both sides, avoid the use of paper reversers (large speed improvement for double sided printing compared to the prior art) (fifth embodiment).

Conclusions, Ramifications, and Scope Of the Invention

A method and apparatus of significantly increasing print speed at low cost has been described. The means also enables double sided printing at reasonable costs and high throughput. Included is a method to butt adjacent regions without print artifacts.

The present invention increases the speed of ink jet printers either by applying multiple print heads to print various regions simultaneously, or using the feathering algorithm presented that enables improved efficiency.

The various embodiments of the present invention discussed above has demonstrated that a 6× improvement in black print rate, (even not accounting for the fact that the method of the first embodiment doesn't require a reverser) is possible. For color, it has been demonstrated that up to a 96× speed improvement is possible—with existing technology.

The methodology of the present invention also enables high quality printing with segmented pagewidth printheads, which is intrinsically much lower cost than monolithic pagewidth printheads.

While several different embodiments and variations thereof have been discussed above, that is not intended to be a complete list of ways that the present invention can be accomplished, thus the present invention is not to be limited to only those. The present invention and its equivalents are all part of the present invention. One skilled in the art will recognize that the same results provided by the disclosed embodiments of the present invention could be achieved with different configurations. Therefore the present invention is only to be limited by the scope of the claims and their equivalents.

What is claimed is:

1. An apparatus for printing on a print medium as said print medium advances along a selected path, said apparatus comprising:
    a print material delivery assembly including:
        a source of print material;
        at least one print device with each print device coupled to said source of print material and each print device having at least one nozzle through which to controllably emit at least one droplet of said print material with said print material delivery assembly oriented to deposit droplets of a print material on at least a portion of said print medium a plurality of times;
    a print firing controller to generate a print firing signal for each, and coupled to, said at least one nozzle of each of said at least one print device to selectively cause said droplets of print material to be deposited onto said print medium; and
    correction factors and substantially uncorrelated print masks integrated with said print firing controller with said correction factors utilized to achieve the desired density of droplets on said print medium with said uncorrelated print masks to independently adjust each print firing signal as each droplet is deposited on a same or a nominally offset position of said print medium;
    wherein said correction factors and uncorrelated masks minimize the visual perception of imperfect dot placement accuracy where the position of one droplet of print material is nominally offset from the position of a predecessor droplet.

2. The apparatus for printing on a print medium as in claim 1 wherein said at least one print device of said print material delivery assembly is incorporated into a printhead mechanism wherein said at least one print device has at least one printhead with each printhead having a plurality of nozzles.

3. The apparatus for printing on a print medium as in claim 2 wherein:
    said print material delivery assembly further includes a transport system to retain and repeatedly bidirectionally scan said printhead mechanism in a printhead transport path across said selected path of said print medium; and
    said print firing controller generates said print firing signals to cause said at least one printhead to deposit droplets of print material on said print medium as said printhead mechanism passes along said printhead transport path in both directions.

4. The apparatus for printing on a print medium as in claim 3 wherein said printhead mechanism includes at least two printheads each disposed to deposit droplets of the same material with each of said at least two printheads spaced apart from each other as they are scanned along said printhead transport path.

5. The apparatus for printing on a print medium as in claim 4 wherein said transport system includes a drive mechanism to which each of said at least two printheads are coupled a fixed distance from each other when scanned in both directions.

6. The apparatus for printing on a print medium as in claim 2 wherein:
    said print material delivery assembly further includes a transport system to retain and repeatedly bidirectionally scan said printhead mechanism in a printhead transport path across said selected path of said print medium;
    said printhead mechanism includes at least one printhead each with at least one nozzle disposed to deposit droplets of said print material having a first color and at least one other nozzle disposed to deposit droplets of said print material having a second color;
    said print firing controller generates said print firing signals to cause each of said nozzles to deposit droplets on said print medium as said printhead mechanism passes along said printhead transport path utilizing a first set of uncorrelated print masks with a unique print mask in said first set for each color of print material when said printhead mechanism is scanned in a forward direction and a second set of uncorrelated print masks with a unique print mask in said second set for each color of print material when said printhead mechanism is scanned in a reverse direction with all print masks in both of said first and second sets of print masks collectively being uncorrelated with each other regardless of which set the print masks are in; and
    different color tables may be used for regions scanned in the forward direction than the color tables used for regions that are scanned in the reverse direction.

7. The apparatus for printing on a print medium as in claim 4 wherein:
  said at least two printheads includes a first plurality of printheads; and
  said transport system includes a second plurality of drive mechanisms, said first plurality being equal to or greater than said second plurality, with each of said drive mechanisms having coupled thereto at least one printhead; and
  said transport system controls said second plurality of drive mechanisms to maintain the printheads coupled to each of said drive mechanisms spaced apart from all other printheads when scanned in both directions along said printhead transport path.

8. The apparatus for printing on a print medium as in claim 4 wherein said transport system includes at least two separately controlled drive mechanisms with each drive mechanism having at least one printhead coupled thereto.

9. The apparatus for printing on a print medium as in claim 8 further comprises a system processor to determine the operational positioning of each printhead and instructs said transport system to operate each drive mechanism to position said printheads accordingly at each point in time without any interference one printhead with another when scanned across said print medium wherein the width of each of said printable regions and shared transition regions results from the operational positioning of the printheads as determined by the system processor.

10. The apparatus for printing on a print medium as in claim 9 wherein the resulting width of each printable region and each transition region is individually determined by said system processor thus the width of each printable region can be different from other printable regions and the width of each transition region can be different from other transition regions.

11. The apparatus for printing on a print medium as in claim 9 wherein each printable region has substantially the same width as each other printable region, and each transition region has substantially the same width as each other transition region.

12. The apparatus for printing on a print medium as in claim 9 wherein the resulting spacing between printheads varies at different points in time during operation of said apparatus.

13. The apparatus for printing on a print medium as in claim 9:
  wherein said system processor instructs said transport system to advance said drive mechanisms to move each printhead to a home position in close proximity to each other outside said print medium selected path when said apparatus in not printing;
  said apparatus further includes a printhead service station located in said home position having both a capping mechanism and a wiping mechanism for each printhead; and
  wherein said system processor controls said printhead service station to cap and wipe said printheads when printing is not being performed.

14. The apparatus for printing on a print medium as in claim 2 wherein:
  said printhead mechanism includes at least two printheads disposed to deposit droplets of the same print material on said print medium;
  said print material delivery assembly further includes a transport system to retain each of said printheads spaced apart from adjacent printheads and to scan said printheads in a printhead transport path each across a corresponding printable portion of said print medium with an overlapping transition region that is included in each adjacent printable portion; and
  said print firing controller generates said print firing signals for said printhead nozzles in adjacent printheads when each of said adjacent printheads is printing in said transition region shared by the adjacent printheads utilizing said substantially uncorrelated print masks.

15. The apparatus for printing on a print medium as in claim 14 wherein the relationship between the print firing signals for said printhead nozzles of each of adjacent printheads in the corresponding transition region at any x axis position within the transition region with one printhead to the left of the other printhead, and one printhead being to the right of the other printhead is $$F = F \cdot \text{Alpha } l + F \cdot \text{Alpha } r \cdot (1 - F \cdot \text{Alpha } l)$$

where:
  F=the print density desired in the transition region (pixels dark);
  Alpha l=the fraction of pixels used from the left printhead; and
  Alpha r=the fraction of pixels used from the right printhead;
  with Alpha l varying from 1 to 0 and Alpha r varying from 0 to 1 with increasing x in the transition region, wherein the Alpha values represent the fraction of the value of print firing signal that would be applied to the corresponding printhead nozzles if only the left or right printhead were printing in the transition region.

16. The apparatus for printing on a print medium as in claim 14 wherein the relationship between the print firing signals for said printhead nozzles of each of adjacent printheads in the corresponding transition region at any x axis position within the transition region with one printhead to the left of the other printhead, and one printhead being to the right of the other printhead is $$D(F) = D(\text{Alpha } l \cdot F) + \{1 - D(\text{Alpha } l \cdot F)\} \cdot D(\text{Alpha } r \cdot F)$$

where:
  D(F)=the density corresponding to the dot density;
  F=the print density desired in the transition region (pixels dark);
  Alpha l=the fraction of pixels used from the left printhead or, equivalently, the left print head correction factor; and
  Alpha r=the fraction of pixels used from the right printhead or, equivalently, the right printhead correction factor;
  with Alpha l varying from 1 to 0 and Alpha r varying from 0 to 1 with increasing x in the transition region, wherein the Alpha value represents the fraction of the value of print firing signal that would be applied to the corresponding printhead nozzles if only the left or right printhead were printing in the transition region.

17. The apparatus for printing on a print medium as in claim 14 wherein a sum of said print droplets deposited in a corresponding transition region to form an image of a selected density by adjacent printheads is greater than the sum of said print droplets printed by one printhead in a portion of an adjacent printable region of a width equal to a width of said corresponding transition region when printing said image of said selected density so the apparent print droplet densities printed by said adjacent printheads are equalized with each other when printing.

18. The apparatus for printing on a print medium as in claim 14 wherein said correction factors are developed using a feathering algorithm.

19. The apparatus for printing on a print medium as in claim 14, wherein said correction factors are adjusted based on the print droplet densities of the respective printheads.

20. The apparatus for printing on a print medium as in claim 14 wherein said correction factors are generated with a correction table to generate the print firing signals for use in adjacent printable portions and in a corresponding transition region between adjacent printable portions.

21. The apparatus for printing on a print medium as in claim 14 wherein said correction factors are generated with interpolation functions to generate the print firing signals for use in adjacent printable portions and the corresponding transition region between adjacent printable portions.

22. The apparatus for printing on a print medium as in claim 14 further comprising:
   a print medium advancing mechanism to selectively position said print medium in said selected path; and
   a system processor coupled to said print medium advancing mechanism, said print firing controller and said transport system to coordinate the positioning of said print medium, and the firing and positioning of said printheads to selectively deposit droplets of said print material at desired locations on the print medium.

23. The apparatus for printing on a print medium as in claim 22 wherein said system processor controls said advancing mechanism, print firing controller and said transport system to cause each printable portion that corresponds to each said printhead on said print medium to be oriented parallel to said selected path with said transition region shared by adjacent printable portions also being oriented parallel to said selected path.

24. The apparatus for printing on a print medium as in claim 23 wherein there is at least one printhead having a same color print material corresponding to each adjacent printable region and shared transition region.

25. The apparatus for printing on a print medium as in claim 14 disposed to deposit droplets of a selected number of print materials on said print medium wherein at least one nozzle in each of said at least two printheads in said printhead assembly is disposed to deposit droplets of each of said selected number of print materials on said at least a portion of said print medium utilizing said correction factors and said substantially uncorrelated masks.

26. The apparatus for printing on a print medium as in claim 14 wherein said print firing controller is disposed to generate print firing signals to cause individual printhead nozzles to deposit multiple droplets of said print material to a same location on said print medium.

27. The apparatus for printing on a print medium as in claim 26 wherein said printhead nozzles deposit multiple droplets of said print material during at least two scans across a same path of said print medium.

28. The apparatus for printing on a print medium as in claim 2 wherein said transport system includes a single drive mechanism to which each of said at least two printheads are coupled a fixed distance from each other resulting in the width of each of said printable regions having a width that is substantially equal to the spacing between two adjacent printheads that each print to the same transition region.

29. The apparatus for printing on a print medium as in claim 28 wherein said fixed distance is substantially equal between each two adjacent printheads resulting in said adjacent printable regions each having the same width.

30. The apparatus for printing on a print medium as in claim 2:
   wherein said print material delivery assembly further includes a transport system to retain and repeatedly scan said printhead mechanism in a printhead transport path across said selected path;
   wherein said print firing controller generates said print firing signals to cause said at least one printhead nozzle to print a swath of droplets on said print medium with said swath having a preset swath height as said printhead assembly passes along said printhead transport path;
   said apparatus further includes a print medium advancing mechanism to selectively advance said print medium in steps in said selected path with each step having a length that is shorter than said swath height resulting in each successive swath overlapping an immediately preceding swath in a transition region; and
   wherein said print firing controller uses a feathering function when printing in said transition region.

31. The apparatus for printing on a print medium as in claim 1 further comprising:
   a printhead service station above or below said selected path of said print medium including:
   a capping mechanism for each of said at least one print device; and
   a wiping mechanism for each of said at least one print device;
   wherein said apparatus for printing when fully assembled is not substantially wider than said selected path of said print medium.

32. The apparatus for printing on a print medium as in claim 31 wherein said service station is below a gap in said selected path of said print medium when said at least one print device is depositing droplets on said print medium.

33. The apparatus for printing on a print medium as in claim 32 further includes a service station elevation mechanism to raise said service station through said gap to cap or wipe said at least one print device when printing is not being performed and to lower said service station to a rest position below said gap when printing is being performed.

34. The apparatus for printing on a print medium as in claim 1 wherein
   said print medium has a top side and a bottom side; and
   said print material delivery assembly includes:
      a first printhead mechanism disposed to deposit droplets of said print material to said top side of said print medium; and
      a second printhead mechanism disposed to deposit droplets of said print material to said bottom side of said print medium.

35. The apparatus for printing on a print medium as in claim 34:
   wherein said first and second printhead mechanisms each includes at least two printheads disposed to deposit droplets of the same material;
   said print material delivery assembly further includes a transport system to retain each of said first and second printhead mechanisms with spaced apart adjacent printheads in each of said first and second printhead mechanisms and to scan said printheads in a printhead transport path each across a corresponding printable portion of said print medium with an overlapping transition region that is included in each adjacent printable portion; and
   wherein said print firing controller generates said print firing signals for said printhead nozzles in adjacent printheads in each of said first and second printhead mechanisms when each of said adjacent printheads is printing in said transition region shared by the adjacent printheads utilizing said substantially uncorrelated print masks.

36. The apparatus for printing on a print medium as in claim 35 wherein said transport system includes one drive mechanism to which each of said first and second printhead mechanisms are coupled with adjacent printheads a fixed distance from each other when scanned in both directions.

37. The apparatus for printing on a print medium as in claim 35 wherein said transport system includes a first drive mechanism to scan said first printhead mechanism in said printhead transport path across said selected path with adjacent printheads spaced apart from each other and a second drive mechanism to scan said second printhead mechanism in said printhead transport path across said selected path with adjacent printheads spaced apart from each other.

38. The apparatus for printing on a print medium as in claim 1 wherein:
   said at least one print device comprises a print array having a main body with a plurality of printing segments mounted thereon with a portion of adjacent ends of each pair of said printing segments overlapping a corresponding same portion of said selected path with said print array mounted across a substantial portion of said selected path with said printing segments facing said selected path with each of said printing segments having a preset number of print nozzles disposed to deposit droplets of said print material on said print medium with the print nozzles that overlap said corresponding same portion of said selected path disposed to deposit droplets of said print material to a same region of said print medium; and
   said print firing controller generates said print firing signal for, and is coupled to, each of said nozzles in each printing segment of said print array where, in the overlapped regions utilizing said correction factors and feathering functions to achieve the desired density of said droplets using said substantially uncorrelated print masks to independently adjust each print firing signal.

39. The apparatus for printing on a print medium as in claim 38 further comprising:
   a print medium advancing mechanism to advance said print medium in discrete steps beneath said print array; and
   a system processor coupled to said print medium advancing mechanism and said print firing controller to coordinate the positioning of said print medium, and the firing of said nozzles in each said printing segment to selectively deposit droplets of said material in successive swaths across said print medium.

* * * * *